United States Patent
Tamura et al.

(10) Patent No.: US 8,440,102 B2
(45) Date of Patent: May 14, 2013

(54) LIQUID CRYSTAL COMPOSITION AND LIQUID CRYSTAL DISPLAY DEVICE

(75) Inventors: Tomohiro Tamura, Tokyo (JP); Tetsuji Ishitani, Kanagawa (JP); Daisuke Kubota, Kanagawa (JP); Akio Yamashita, Kanagawa (JP); Sachiko Kawakami, Kanagawa (JP); Yuko Kawata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 85 days.

(21) Appl. No.: 13/104,202

(22) Filed: May 10, 2011

(65) Prior Publication Data

US 2011/0284797 A1    Nov. 24, 2011

(30) Foreign Application Priority Data

May 21, 2010   (JP) .................................. 2010-117325
Jan. 31, 2011   (JP) .................................. 2011-018023

(51) Int. Cl.
| | | |
|---|---|---|
| *C09K 19/00* | (2006.01) | |
| *C09K 19/06* | (2006.01) | |
| *C09K 19/34* | (2006.01) | |
| *C09K 19/52* | (2006.01) | |
| *G02F 1/1333* | (2006.01) | |

(52) U.S. Cl.
USPC .............. 252/299.66; 252/299.01; 252/299.6; 428/1.1; 428/1.2; 428/1.3; 349/1; 349/86; 349/182

(58) Field of Classification Search ............. 252/299.01, 252/299.6, 299.66; 428/1.1, 1.2, 1.3; 349/1, 349/86, 182
See application file for complete search history.

(56) References Cited

U.S. PATENT DOCUMENTS

| | | | |
|---|---|---|---|
| 5,733,477 | A | 3/1998 | Kondo et al. |
| 6,051,288 | A | 4/2000 | Kondo et al. |
| 6,551,670 | B2 | 4/2003 | Tahara et al. |
| 7,576,829 | B2 | 8/2009 | Kikuchi et al. |
| 7,648,647 | B2 | 1/2010 | Kikuchi et al. |
| 2008/0259254 | A1 | 10/2008 | Kikuchi et al. |
| 2012/0194775 | A1* | 8/2012 | Kawakami et al. ........... 349/139 |

FOREIGN PATENT DOCUMENTS

| | | |
|---|---|---|
| JP | 2006-348226 | 12/2006 |
| JP | 2007-308534 | 11/2007 |
| JP | 2008-303381 | 12/2008 |
| WO | WO 96/32365 A1 | 10/1996 |
| WO | WO-2005/080529 A1 | 9/2005 |
| WO | WO2005/080529 A1 | 9/2005 |
| WO | WO 2005/090520 A1 | 9/2005 |
| WO | WO-2011/145536 | 11/2011 |

OTHER PUBLICATIONS

Yokokoji.O et al., "Synthesis of new chiral compounds for cholesteric liquid crystal display,", Liquid Crystals, Aug. 1, 2008, vol. 35, No. 8, pp. 995-1003.
International Search Report (Application No. PCT/JP2011/061117; PCT13549/14626) Dated Aug. 2, 2011.
Written Opinion (Application No. PCT/JP2011/061117; PCT13549/14626) Dated Aug. 2, 2011.
International Search Report (Application No. PCT/JP2012/051483; PCT14625) Dated Apr. 24, 2012.
Written Opinion (Application No. PCT/JP2012/051483; PCT14625) Dated Apr. 24, 2012.

* cited by examiner

*Primary Examiner* — Geraldina Visconti
(74) *Attorney, Agent, or Firm* — Nixon Peabody LLP; Jeffery L. Costellia

(57) ABSTRACT

An object is to provide a liquid crystal composition which exhibits a blue phase in a wide temperature range. Another object is to provide a liquid crystal composition which exhibits a blue phase, with which high contrast can be provided, in a liquid crystal display device. A liquid crystal composition which exhibits a blue phase includes: a nematic liquid crystal including a compound represented by a structural formula (100) (PPEP-5FCNF (abbreviation)); and a chiral agent. In a liquid crystal display device, a liquid crystal layer is formed using the liquid crystal composition including a nematic liquid crystal including a compound represented by a structural formula (100) (PPEP-5FCNF (abbreviation)) and a chiral agent, and the liquid crystal composition exhibits a blue phase.

(100)

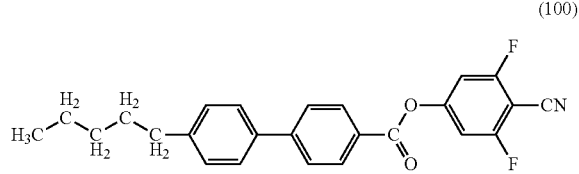

9 Claims, 12 Drawing Sheets

LIQUID CRYSTAL COMPOSITION AND LIQUID CRYSTAL DISPLAY DEVICE

TECHNICAL FIELD

The present invention relates to a liquid crystal composition, a liquid crystal display device, and a method for manufacturing thereof.

BACKGROUND ART

As thin and lightweight display devices (so-called flat panel displays), liquid crystal display devices including liquid crystal elements, light-emitting devices including self-luminous elements, field-emission displays (FEDs), and the like have been competitively developed.

In liquid crystal display devices, higher-speed response of liquid crystal molecules has been required. Among various kinds of display modes of a liquid crystal, liquid crystal modes capable of high-speed response are a ferroelectric liquid crystal (FLC) mode, an optical compensated birefringence (OCB) mode, and a mode using a liquid crystal exhibiting a blue phase.

In particular, the mode using a liquid crystal exhibiting a blue phase does not require an alignment film and provides a wide viewing angle, and thus has been developed more actively for practical use (see Patent Document 1, for example). Patent Document 1 reports that polymer stabilization treatment is performed on a liquid crystal to extend the temperature range in which a blue phase appears.

REFERENCE

Patent Document

[Patent Document 1] PCT International Publication No. 2005-090520

DISCLOSURE OF INVENTION

One of objects is to provide a liquid crystal composition with a wide temperature range where a blue phase is exhibited.

One of objects is to provide a liquid crystal display device with a higher contrast.

An embodiment of the structure of the present invention which is disclosed in this specification is a liquid crystal composition including: a nematic liquid crystal including a compound represented by a structural formula (100) shown below; and a chiral agent, and the liquid crystal composition exhibits a blue phase. In this specification, a compound represented by the structural formula (100) below is referred to as 4-(4-n-pentylphenyl)benzoic acid 4-cyano-3,5-difluorophenyl (abbreviation: PPEP-5FCNF).

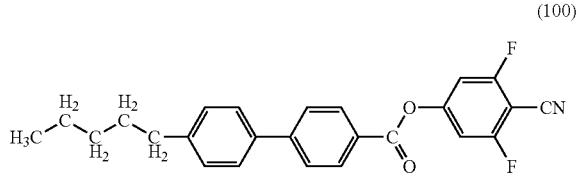 [SMILES: CCCCCc1ccc(-c2ccc(C(=O)Oc3cc(F)c(C#N)c(F)c3)cc2)cc1]

(100)

Another embodiment of the structure of the present invention which is disclosed in this specification is a liquid crystal composition including: a nematic liquid crystal including a compound represented by the structural formula (100) below; a chiral agent; a photocurable resin; and a photopolymerization initiator, and the liquid crystal composition exhibits a blue phase.

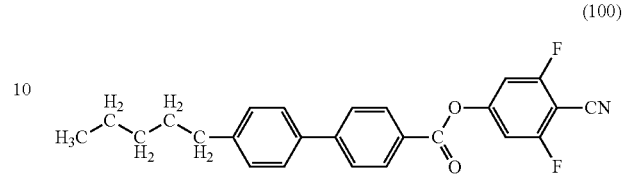

(100)

The liquid crystal composition which exhibits a blue phase includes a liquid crystal and a chiral agent. The chiral agent is employed to align the liquid crystal in a helical structure and to make the liquid crystal exhibit a blue phase. For example, a chiral agent may be mixed at 5 w % or more in the liquid crystal composition.

For the chiral agent, a material which has a high compatibility with a liquid crystal and has a strong twisting power is used. In addition, either an R-enantiomer or an S-enantiomer is favorable as the material, and a racemic body in which an R-enantiomer and an S-enantiomer are mixed at a ratio of 50:50 is not used.

The liquid crystal composition which exhibits a blue phase shows a cholesteric phase, a cholesteric blue phase, an isotropic phase, or the like depending on conditions.

A cholesteric blue phase which is a blue phase is observed in a liquid crystal composition having a cholesteric phase with a relatively short helical pitch of 500 nm or less. The alignment of the liquid crystal has a double twist structure. Having the order of less than or equal to the wavelength of visible light, the liquid crystal composition is transparent, and optical modulation action is generated through a change in alignment order by voltage application. A blue phase is optically isotropic and thus has no viewing angle dependence. Consequently, an alignment film is not necessarily formed, which results in an improvement in display image quality and cost reduction.

Since the blue phase is exhibited only in a narrow temperature range, a photocurable resin and a photopolymerization initiator are added to a liquid crystal composition and polymer stabilization treatment is performed in order to widen the temperature range. The polymer stabilization treatment is performed in such a manner that a liquid crystal compound including a liquid crystal, a chiral agent, a photocurable resin, and a photopolymerization initiator is irradiated with light having a wavelength with which the photocurable resin and the photopolymerization initiator react.

For example, the polymer stabilization treatment is performed in the following manner: the temperature of the liquid crystal composition is controlled and under the state in which a blue phase is exhibited, the liquid crystal composition is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Moreover, in the case where an ultraviolet curable resin (a UV curable resin) is used as the photocurable resin included in the liquid crystal composition, the liquid crystal layer may be irradiated with ultraviolet rays.

The liquid crystal composition which exhibits a blue phase can be used for a liquid crystal layer of a liquid crystal display device. The liquid crystal composition which exhibits a blue phase has a short response time of 1 msec or less and is capable of high-speed response. Thus, a high-performance liquid crystal display device can be achieved.

The liquid crystal composition which exhibits a blue phase, including the nematic liquid crystal including PPEP-5FCNF (abbreviation), and the chiral agent is a liquid crystal composition with a wide temperature range where a blue phase is exhibited.

With the use of the liquid crystal composition which exhibits a blue phase for a liquid crystal layer, a liquid crystal display device which achieves higher contrast can be provided.

BRIEF DESCRIPTION OF DRAWINGS

FIGS. 7A1, 7A2, and 7B illustrate a liquid crystal display module.

BEST MODE FOR CARRYING OUT THE INVENTION

Figure 1:
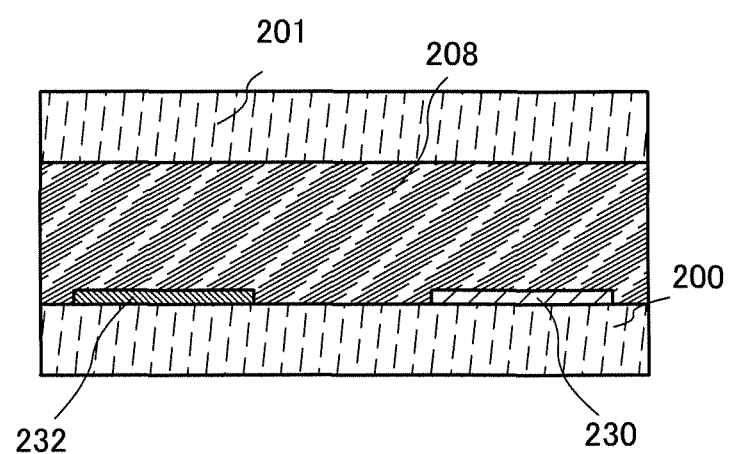
FIG. 1 is a conceptual view illustrating a liquid crystal composition.

Embodiments will be described in detail with reference to drawings. However, the present invention is not limited to the following description, and various changes for the modes and details thereof will be apparent to those skilled in the art unless such changes depart from the spirit and the scope of the invention. Therefore, the disclosed invention is not interpreted as being limited to the description of the embodiments below. In the structures to be given below, the same portions or portions having similar functions are denoted by the same reference numerals in different drawings, and explanation thereof will not be repeated.

Note that the ordinal numbers such as "first", "second", and "third" in this specification are used for convenience and do not denote the order of steps and the stacking order of layers. In addition, the ordinal numbers in this specification do not denote particular names which specify the present invention.

In this specification, a semiconductor device generally means a device which can function by utilizing semiconductor characteristics, and an electrooptic device, a semiconductor circuit, and an electronic device are all semiconductor devices.

Embodiment 1

A liquid crystal composition which is an embodiment of the structure of the invention disclosed in this specification, and a liquid crystal display device including the liquid crystal composition will be described with reference to FIG. 1. FIG. 1 is a cross-sectional view of a liquid crystal display device.

The liquid crystal composition in accordance with this embodiment is a liquid crystal composition which exhibits a blue phase, including: a nematic liquid crystal including a compound represented by a structural formula (100) shown below (PPEP-5FCNF (abbreviation)); and a chiral agent.

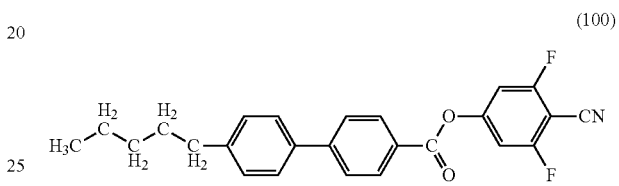

(100)

The liquid crystal composition in accordance with this embodiment is a liquid crystal composition which exhibits a blue phase, including: a nematic liquid crystal including a compound represented by the structural formula (100) shown below (PPEP-5FCNF (abbreviation)); a chiral agent; a photocurable resin; and a photopolymerization initiator.

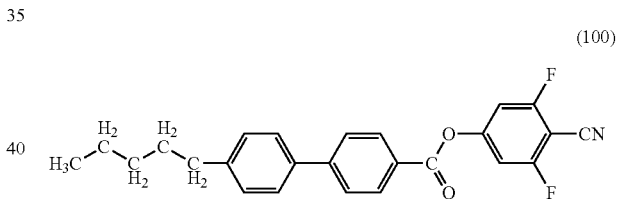

(100)

The liquid crystal composition which exhibits a blue phase includes a liquid crystal and a chiral agent. The chiral agent is employed to align the liquid crystal in a helical structure and to make the liquid crystal exhibit a blue phase. For example, a chiral agent may be mixed at 5 w % or more into the liquid crystal composition.

For the chiral agent, a material which has a high compatibility with a liquid crystal and has a strong twisting power is used. In addition, either an R-enantiomer or an S-enantiomer is favorable as the material, and a racemic body in which an R-enantiomer and an S-enantiomer are mixed at a ratio of 50:50 is not used.

The liquid crystal composition which exhibits a blue phase shows a cholesteric phase, a cholesteric blue phase, an isotropic phase, or the like depending on conditions.

A cholesteric blue phase which is a blue phase is observed in a liquid crystal composition having a cholesteric phase with a relatively short helical pitch of 500 nm or less. The alignment of the liquid crystal has a double twist structure. Having the order of less than or equal to the wavelength of visible light, the liquid crystal composition is transparent, and optical modulation action is generated through a change in alignment order by voltage application. A blue phase is optically isotropic and thus has no viewing angle dependence.

Consequently, an alignment film is not necessarily formed, which results in an improvement in display image quality and cost reduction.

Since the blue phase is exhibited only in a narrow temperature range, a photocurable resin and a photopolymerization initiator are added to a liquid crystal composition and polymer stabilization treatment is performed in order to widen the temperature range. The polymer stabilization treatment is performed in such a manner that a liquid crystal compound including a liquid crystal, a chiral agent, a photocurable resin, and a photopolymerization initiator is irradiated with light having a wavelength with which the photocurable resin and the photopolymerization initiator react.

For example, the polymer stabilization treatment is performed in the following manner: the temperature of the liquid crystal composition is controlled and under the state in which a blue phase is exhibited, the liquid crystal composition is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Moreover, in the case where an ultraviolet curable resin (a UV curable resin) is used as the photocurable resin included in the liquid crystal composition, the liquid crystal layer may be irradiated with ultraviolet rays.

The photocurable resin may be a monofunctional monomer such as acrylate or methacrylate; a polyfunctional monomer such as diacrylate, triacrylate, dimethacrylate, or trimethacrylate; or a mixture thereof. The photocurable resin may be liquid crystalline (a liquid crystalline monofunctional monomer or a liquid crystalline polyfunctional monomer), non liquid crystalline (a non-liquid-crystalline monofunctional monomer or a non-liquid-crystalline polyfunctional monomer), or may be in both of the states. A resin which is cured with light having a wavelength with which the photopolymerization initiator to be used is reacted may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, the liquid crystal composition has high reliability.

The liquid crystal composition which exhibits a blue phase, which is disclosed in this specification, can be used for a liquid crystal layer of a liquid crystal display device. FIG. 1 shows an example in which the liquid crystal composition which exhibits a blue phase, which is disclosed in this specification, is used for a liquid crystal layer of a liquid crystal display device.

FIG. 1 illustrates a liquid crystal display device in which the first substrate 200 and the second substrate 201 are positioned so as to face each other with a liquid crystal layer 208 which includes a liquid crystal composition interposed between the first substrate 200 and the second substrate 201. The liquid crystal composition exhibits a blue phase. A pixel electrode layer 230 and a common electrode layer 232 are provided between the first substrate 200 and the liquid crystal layer 208 so as to be adjacent to each other.

In a liquid crystal display device including a liquid crystal layer including a liquid crystal composition which exhibits a blue phase, a method in which the gray scale is controlled by generation of an electric field generally parallel (i.e., in a lateral direction) to a substrate to move liquid crystal molecules in a plane parallel to the substrate can be used.

The pixel electrode layer 230 and the common electrode layer 232, which are adjacent to each other with the liquid crystal layer 208 interposed therebetween, have a distance at which a liquid crystal in the liquid crystal layer 208 between the pixel electrode layer 230 and the common electrode layer 232 responds to a predetermined voltage which is applied to the pixel electrode layer 230 and the common electrode layer 232. The voltage applied is controlled depending on the distance as appropriate.

The maximum thickness (film thickness) of the liquid crystal layer 208 is preferably greater than or equal to 1 μm and less than or equal to 20 μm.

The liquid crystal layer 208 can be formed by a dispenser method (a dropping method), or an injection method by which a liquid crystal is injected using a capillary phenomenon or the like after the first substrate 200 is attached to the second substrate 201.

The liquid crystal layer 208 is formed using the liquid crystal composition which exhibits a blue phase, including the nematic liquid crystal including the compound (PPEP-5FCNF (abbreviation)), and the chiral agent. The liquid crystal composition may further include the photocurable resin and the photopolymerization initiator.

With an electric field formed between the pixel electrode layer 230 and the common electrode layer 232, a liquid crystal is controlled. An electric field in a lateral direction is formed for the liquid crystal, so that liquid crystal molecules can be controlled using the electric field. That is, the liquid crystal molecules aligned to exhibit a blue phase can be controlled in a direction parallel to the substrate, whereby a wide viewing angle is obtained.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, a liquid crystal display device including the liquid crystal composition in a liquid crystal layer can have high reliability.

Further, when the liquid crystal layer is formed using the liquid crystal composition which exhibits a blue phase, including the nematic liquid crystal including PPEP-5FCNF (abbreviation), and the chiral agent, high contrast can be provided. Thus, a high-definition liquid crystal display device with high visibility can be provided.

The liquid crystal composition which exhibits a blue phase has a short response time of 1 msec or less and is capable of high-speed response. Thus, a high-performance liquid crystal display device can be achieved.

For example, the liquid crystal composition exhibiting a blue phase can be favorably used for a successive additive color mixing method (a field sequential method) in which light-emitting diodes (LEDs) of RGB or the like are provided in a backlight unit and color display is performed by time division, or a three-dimensional display method using a shutter glasses system in which images for the right eye and images for the left eye are alternately viewed by time division.

Although not illustrated in FIG. 1, an optical film such as a polarizing plate, a retardation plate, or an anti-reflection film, or the like is provided as appropriate. For example, circular polarization by the polarizing plate and the retardation plate may be used. In addition, a backlight or the like can be used as a light source.

In this specification, a substrate which is provided with a semiconductor element (e.g., a transistor), a pixel electrode layer, and a common electrode layer is referred to as an element substrate (a first substrate), and a substrate which faces the element substrate with a liquid crystal layer interposed therebetween is referred to as a counter substrate (a second substrate).

The liquid crystal composition which exhibits a blue phase, including the nematic liquid crystal including PPEP-5FCNF (abbreviation), and the chiral agent is used for a liquid crystal display device. Thus, a transmissive liquid crystal display device in which display is performed by transmission of light from a light source, a reflective liquid crystal display device in which display is performed by reflection of incident light, or a semi-transmissive liquid crystal display device in which a transmissive type and a reflective type are combined can be provided.

In the case of the transmissive liquid crystal display device, the first substrate, the second substrate, and other components such as an insulating film and a conductive film which are present in a pixel region through which light is transmitted all have light-transmitting properties with respect to light in a visible wavelength range. It is preferable that the pixel electrode layer and the common electrode layer have light-transmitting properties; however, if an opening pattern is provided, a non-light-transmitting material such as a metal film may be used depending on the shape.

In the case of the reflective liquid crystal display device, a reflective component which reflects light passed through the liquid crystal layer (e.g., reflective film or substrate) may be provided on the side opposite to the viewer side of the liquid crystal layer. Therefore, a substrate, an insulating film, and a conductive film through which light is transmitted have light-transmitting properties with respect to light in the visible wavelength range and are provided between the viewer side and the reflective component. Note that in this specification, a light-transmitting property refers to a property of transmitting at least light in the visible wavelength range.

The pixel electrode layer 230 and the common electrode layer 232 may be formed using one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide including tungsten oxide, indium zinc oxide including tungsten oxide, indium oxide including titanium oxide, and indium tin oxide including titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

As the first substrate 200 and the second substrate 201, a glass substrate of barium borosilicate glass, aluminoborosilicate glass, or the like, a quartz substrate, a plastic substrate, or the like can be used.

The liquid crystal composition which exhibits a blue phase, including the nematic liquid crystal including PPEP-5FCNF (abbreviation), and the chiral agent is a liquid crystal composition with a wide temperature range where a blue phase is exhibited.

With the use of the liquid crystal composition which exhibits a blue phase for a liquid crystal layer, a liquid crystal display device which achieves higher contrast can be provided.

Embodiment 2

The invention disclosed in this specification can be applied to both a passive matrix liquid crystal display device and an active matrix liquid crystal display device. In this embodiment, an example of an active matrix liquid crystal display device to which the invention disclosed in this specification is applied will be described with reference to FIGS. 2A and 2B and FIGS. 3A and 3D.

Figure 2A:
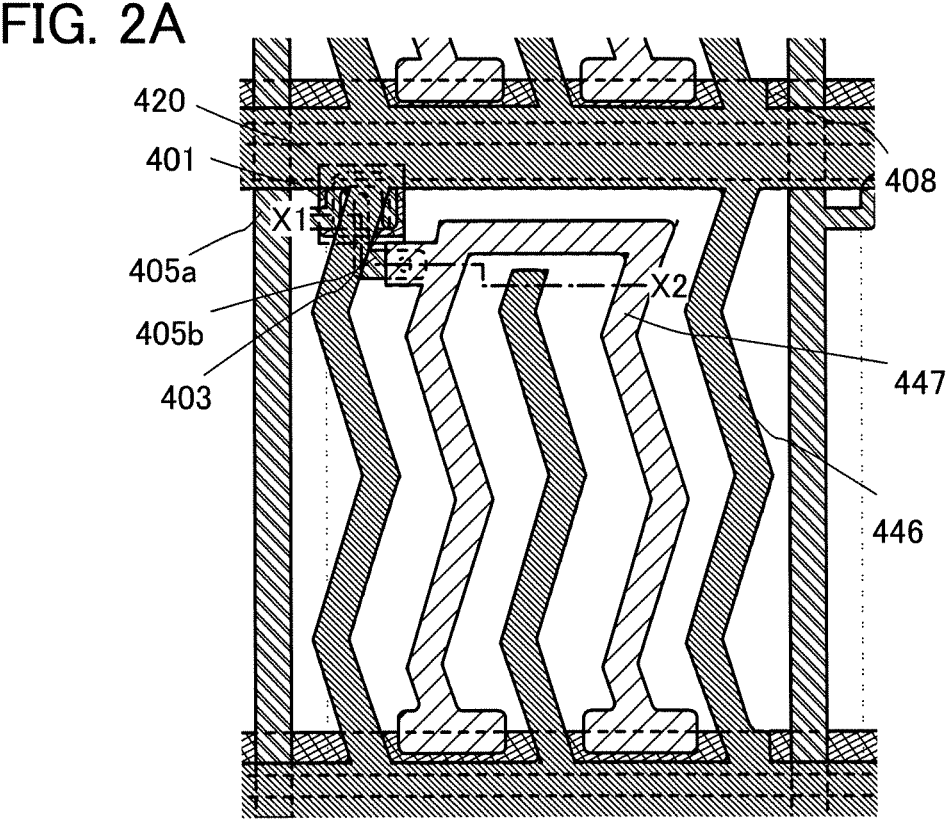
FIGS. 2A and 2B illustrate one mode of a liquid crystal display device.
Figure 2B:
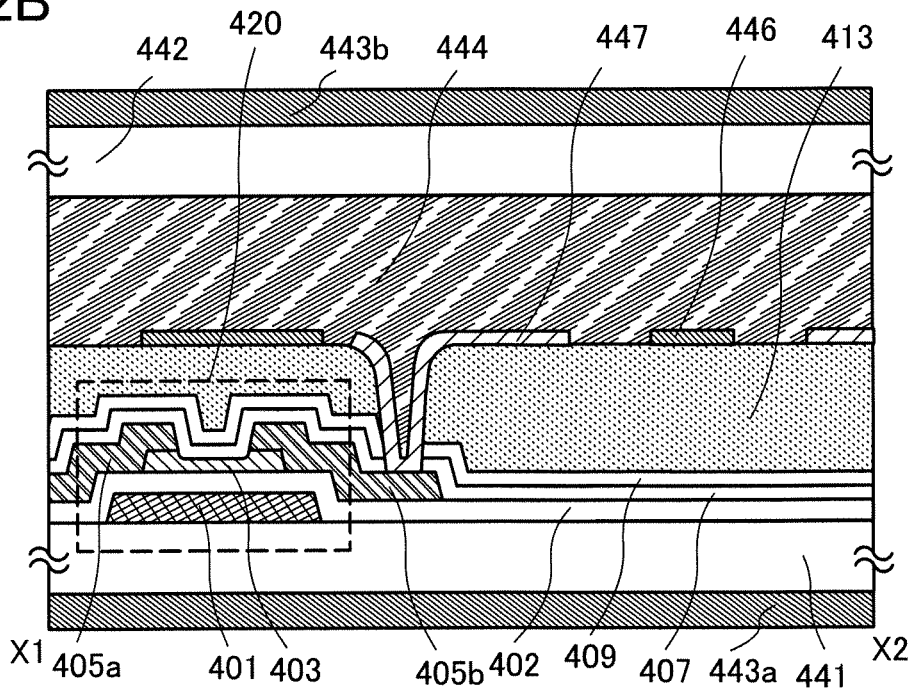

FIG. 2A is a plan view of the liquid crystal display device and illustrates one pixel. FIG. 2B is a cross-sectional view taken along line X1-X2 in FIG. 2A.

In FIG. 2A, a plurality of source wiring layers (including a wiring layer 405a) are provided in parallel to each other (extended in the vertical direction in the drawing) and apart from each other. A plurality of gate wiring layers (including a gate electrode layer 401) are provided to be extended in a direction generally perpendicular to the source wiring layers (the horizontal direction in the drawing) and apart from each other. Common wiring layers 408 are provided adjacent to the respective plurality of gate wiring layers and extended in a direction generally parallel to the gate wiring layers, that is, in a direction generally perpendicular to the source wiring layers (the horizontal direction in the drawing). Roughly rectangular spaces are surrounded by the source wiring layers, the common wiring layers 408, and the gate wiring layers, and a pixel electrode layer and a common wiring layer of a liquid crystal display device are provided in these spaces. A transistor 420 for driving the pixel electrode layer is provided at an upper left corner of the drawing. A plurality of pixel electrode layers and a plurality of transistors are arranged in matrix.

In the liquid crystal display device of FIGS. 2A and 2B, a first electrode layer 447 which is electrically connected to the transistor 420 serves as a pixel electrode layer, while a second electrode layer 446 which is electrically connected to the common electrode layer 408 serves as a common electrode layer. Note that a capacitor is formed by the first electrode layer and the common wiring layer. Although a common electrode layer can operate in a floating state (an electrically isolated state), the potential of the common electrode layer may be set to a fixed potential, preferably to a potential around a common potential (an intermediate potential of an image signal which is transmitted as data) in such a level as not to generate flickers.

A method in which the gray scale is controlled by generation of an electric field generally parallel (i.e., in a lateral direction) to a substrate to move liquid crystal molecules in a plane parallel to the substrate can be used. For such a method, an electrode structure used in an IPS mode as illustrated in FIGS. 2A and 2B and FIGS. 3A to 3C can be employed.

In a lateral electric field mode such as an IPS mode, a first electrode layer (e.g., a pixel electrode layer with which voltage is controlled per pixel) and a second electrode layer (e.g., a common electrode layer with which common voltage is applied to all pixels), which have an opening pattern, are located below a liquid crystal layer. Therefore, the first electrode layer 447 and the second electrode layer 446, one of which is a pixel electrode layer and the other of which is a common electrode layer, are formed over a first substrate 441, and at least one of the first electrode layer and the second electrode layer is formed over an interlayer film. The first electrode layer 447 and the second electrode layer 446 have not a plane shape but various opening patterns including a bend portion or a comb-shaped portion. The first electrode layer 447 and the second electrode layer 446 are provided so as to have the same pattern and so as not to overlap with each other in order to generate an electric field between the electrodes.

The liquid crystal layer 444 is formed using the liquid crystal composition which exhibits a blue phase, including the nematic liquid crystal including the compound (PPEP-5FCNF (abbreviation)) described in Embodiment 1, and the chiral agent. The liquid crystal composition may further include the photocurable resin and the photopolymerization initiator. The liquid crystal layer 444 is subjected to polymer stabilization treatment, whereby the liquid crystal layer 444 is provided in a state where a blue phase is exhibited (also referred to as a state of exhibiting a blue phase or a state showing a blue phase) in a liquid crystal display device.

With an electric field formed between the first electrode layer 447 as the pixel electrode layer and the second electrode layer 446 as the common electrode layer, a liquid crystal of the liquid crystal layer 444 is controlled. An electric field in a lateral direction is formed for the liquid crystal, so that liquid crystal molecules can be controlled using the electric field. That is, the liquid crystal molecules aligned to exhibit a blue phase can be controlled in a direction parallel to the substrate, whereby a wide viewing angle is obtained.

Figure 3A:
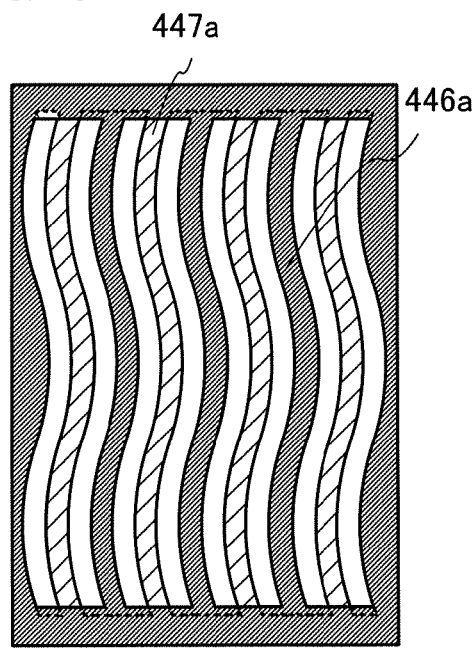
FIGS. 3A to 3D each illustrate one mode of the electrode structure of a liquid crystal display device.
Figure 3B:
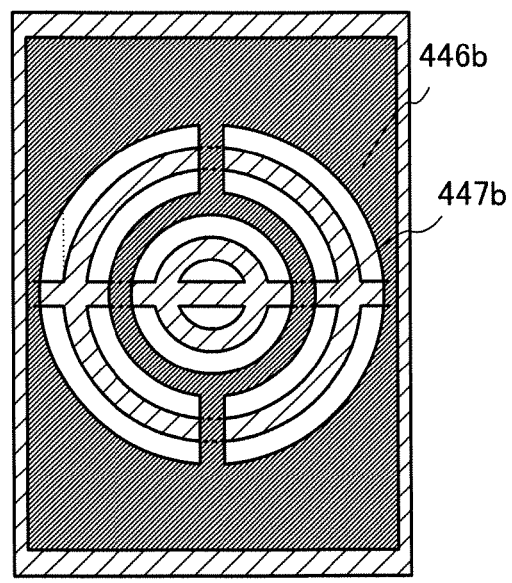
Figure 3C:
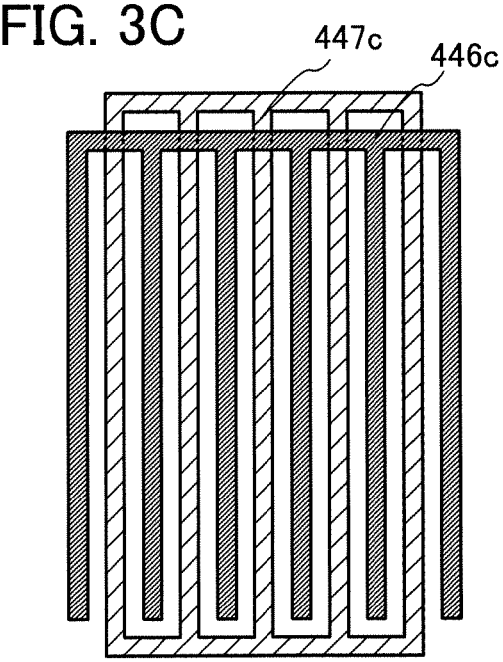
Figure 3D:
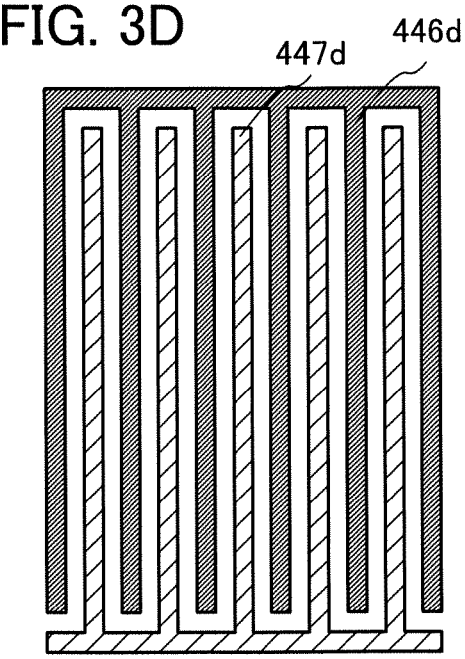

FIGS. 3A to 3D show other examples of the first electrode layer 447 and the second electrode layer 446. As illustrated in top views of FIGS. 3A to 3D, first electrode layers 447*a* to 447*d* and second electrode layers 446*a* to 446*d* are arranged alternately. In FIG. 3A, the first electrode layer 447*a* and the second electrode layer 446*a* have a wavelike shape with curves. In FIG. 3B, the first electrode layer 447*b* and the second electrode layer 446*b* have a shape with concentric circular openings. In FIG. 3C, the first electrode layer 447*c* and the second electrode layer 446*c* have a comb-shape and partially overlap with each other. In FIG. 3D, the first electrode layer 447*d* and the second electrode layer 446*d* have a comb-shape in which the electrode layers are engaged with each other. In the case where the first electrode layer 447*a*, 447*b*, or 447*c* overlaps with the second electrode layer 446*a*, 446*b*, or 446*c* as illustrated in FIGS. 3A to 3C, an insulating film is formed between the first electrode layer 447 and the second electrode layer 446 so that the first electrode layer 447 and the second electrode layer 446 are formed over different films.

Since the first electrode layer 447 and the second electrode layer 446 have an opening pattern, they are illustrated as divided plural electrode layers in the cross-sectional view of FIG. 2B. This is the same as in the other drawings of this specification.

The transistor 420 is an inverted staggered thin film transistor in which the gate electrode layer 401, a gate insulating layer 402, a semiconductor layer 403, and wiring layers 405*a* and 405*b* which function as a source electrode layer and a drain electrode layer are formed over the first substrate 441 which has an insulating surface.

There is no particular limitation on a structure of a transistor which can be applied to a liquid crystal display device disclosed in this specification. For example, a staggered type transistor or a planar type transistor having a top-gate structure or a bottom-gate structure can be used. The transistor may have a single-gate structure including one channel formation region, a double-gate structure including two channel formation regions, or a triple-gate structure including three channel formation regions. Alternatively, the transistor may have a dual gate structure including two gate electrode layers positioned over and below a channel region with a gate insulating layer provided therebetween.

An insulating film 407 which is in contact with the semiconductor layer 403, and an insulating film 409 are provided to cover the transistor 420. An interlayer film 413 is stacked over the insulating film 409.

There is no particular limitation on the method for forming the interlayer film 413, and the following method can be employed depending on the material: spin coating, dip coating, spray coating, droplet discharging (such as ink jetting, screen printing, or offset printing), roll coating, curtain coating, knife coating, or the like.

The first substrate 441 and the second substrate 442 which is the counter substrate are fixed to each other with a sealant with the liquid crystal layer 444 interposed therebetween. The liquid crystal layer 444 can be formed by a dispenser method (a dropping method), or an injection method by which a liquid crystal is injected using a capillary phenomenon or the like after the first substrate 441 is attached to the second substrate 442.

As the sealant, it is preferable to use visible light curable, ultraviolet curable, or heat curable resin representatively. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealant.

The liquid crystal layer 444 is formed using the liquid crystal composition which exhibits a blue phase, including the nematic liquid crystal including the compound (PPEP-5FCNF (abbreviation)) described in Embodiment 1, and the chiral agent. The liquid crystal composition may further include the photocurable resin and the photopolymerization initiator.

After the space between the first substrate 441 and the second substrate 442 is filled with the liquid crystal composition, polymer stabilization treatment is performed by light irradiation, whereby the liquid crystal layer 444 is formed. The light has a wavelength with which the photocurable resin and the photopolymerization initiator included in the liquid crystal layer are reacted. By such polymer stabilization treatment by light irradiation, the temperature range where the liquid crystal layer 444 exhibits a blue phase can be widened.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, a liquid crystal display device including the liquid crystal composition in a liquid crystal layer can have high reliability.

In the case where a photocurable resin such as an ultraviolet curable resin is used as a sealant and a liquid crystal layer is formed by a dropping method, for example, the sealant may be cured by the light irradiation step of the polymer stabilization treatment.

In this embodiment, a polarizing plate 443a is provided on the outer side of the first substrate 441 (on the side opposite to the liquid crystal layer 444), and a polarizing plate 443b is provided on the outer side of the second substrate 442 (on the side opposite to the liquid crystal layer 444). In addition to the polarizing plate, an optical film such as a retardation plate or an anti-reflection film may be provided. For example, circular polarization by the polarizing plate and the retardation plate may be used. Through the above-described process, a liquid crystal display device can be completed.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

The first electrode layer 447 and the second electrode layer 446 can be formed using a light-transmitting conductive material such as indium oxide including tungsten oxide, indium zinc oxide including tungsten oxide, indium oxide including titanium oxide, indium tin oxide including titanium oxide, indium tin oxide (hereinafter referred to as ITO), indium zinc oxide, or indium tin oxide to which silicon oxide is added.

The first electrode layer 447 and the second electrode layer 446 can be formed using one or more of the following: metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys of these metals; and metal nitrides of these metals.

The first electrode layer 447 and the second electrode layer 446 can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 $\Omega\cdot$cm.

As the conductive high molecule, a so-called $\pi$-electron conjugated conductive polymer can be used. For example, polyaniline or a derivative thereof, polypyrrole or a derivative thereof, polythiophene or a derivative thereof, a copolymer of two or more of aniline, pyrrole, and thiophene or a derivative thereof, or the like can be given.

An insulating film serving as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film. The gate electrode layer 401 can be formed to have a single-layer or a stacked-layer structure using a metal material such as molybdenum, titanium, chromium, tantalum, tungsten, aluminum, copper, neodymium, or scandium, or an alloy material which contains any of these materials as its main component. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, a three-layer structure in which a tungsten layer or a tungsten nitride layer, an alloy of aluminum and silicon or an alloy of aluminum and titanium, and a titanium nitride layer or a titanium layer are stacked is preferable.

The gate insulating layer 402 can be formed using a silicon oxide layer, a silicon nitride layer, a silicon oxynitride layer, or a silicon nitride oxide layer to have a single-layer or stacked-layer structure by a plasma CVD method, a sputtering method, or the like. Alternatively, the gate insulating layer 402 can be formed using a silicon oxide layer by a CVD method in which an organosilane gas is used. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or tris-dimethylaminosilane (chemical formula: $SiH(N(CH_3)_2)_3$) can be used.

A material of the semiconductor layer 403 is not limited to a particular material and may be determined in accordance with characteristics needed for the transistor 420, as appropriate. Examples of a material which can be used for the semiconductor layer 403 will be described.

The semiconductor layer 403 can be formed using the following material: an amorphous semiconductor manufactured by a sputtering method or a vapor-phase growth method using a semiconductor source gas typified by silane or germane; a polycrystalline semiconductor formed by crystallizing the amorphous semiconductor with the use of light energy or thermal energy; a microcrystalline semiconductor; or the like. The semiconductor layer can be formed by a sputtering method, an LPCVD method, a plasma CVD method, or the like.

As a typical example of an amorphous semiconductor, hydrogenated amorphous silicon can be given, and as a typical example of a crystalline semiconductor, polysilicon or the like can be given. Examples of polysilicon (polycrystalline silicon) include so-called high-temperature polysilicon which contains polysilicon formed at a process temperature of 800° C. or more as the main component, so-called low-temperature polysilicon which contains polysilicon formed at a process temperature of 600° C. or less as the main component, polysilicon obtained by crystallizing amorphous silicon by using an element that promotes crystallization or the like, and the like. Needless to say, as described above, a microcrystalline semiconductor, or a semiconductor which includes a crystalline phase in part of a semiconductor layer can be used.

Further, an oxide semiconductor may be used. An In—Sn—Ga—Zn—O-based oxide semiconductor layer which is an oxide of four metal elements; an In—Ga—Zn—O-based oxide semiconductor layer, an In—Sn—Zn—O-based oxide semiconductor layer, an In—Al—Zn—O-based oxide semiconductor layer, a Sn—Ga—Zn—O-based oxide semiconductor layer, an Al—Ga—Zn—O-based oxide semiconductor layer, or a Sn—Al—Zn—O-based oxide semiconductor layer which are oxides of three metal elements; an In—Zn—O-based oxide semiconductor layer, a Sn—Zn—O-based oxide semiconductor layer, an Al—Zn—O-based oxide semiconductor layer, a Zn—Mg—O-based oxide semiconductor layer, a Sn—Mg—O-based oxide semiconductor layer, an In—Mg—O-based oxide semiconductor layer, or In—Ga—O-based oxide semiconductor layer which are oxides of two metal elements; or an In—O-based oxide semiconductor layer, a Sn—O-based oxide semiconductor layer, or a Zn—O-based oxide semiconductor layer which are oxides of one metal element can be used. Further, $SiO_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

For the oxide semiconductor layer, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the case where an In—Zn—O-based material is used as the oxide semiconductor, the atomic ratio is set so that In/Zn is in a range from 0.5 to 50, preferably from 1 to 20, more preferably from 1.5 to 15. When the atomic ratio of Zn is in the above-described range, a transistor can be improved in field-effect mobility. Here, when the atomic ratio of the compound is In:Zn:O=X:Y:Z, the relation Z>1.5X+Y is satisfied.

In a process of forming the semiconductor layer and the wiring layer, an etching step is used to process thin films into desired shapes. Dry etching or wet etching can be used for the etching step.

As an etching apparatus used for the dry etching, an etching apparatus using a reactive ion etching method (an RIE method), or a dry etching apparatus using a high-density plasma source such as ECR (electron cyclotron resonance) or ICP (inductively coupled plasma) can be used. As a dry etching apparatus by which uniform electric discharge can be obtained over a wider area as compared to an ICP etching apparatus, there is an ECCP (enhanced capacitively coupled plasma) mode apparatus in which an upper electrode is grounded, a high-frequency power source at 13.56 MHz is connected to a lower electrode, and further a low-frequency power source at 3.2 MHz is connected to the lower electrode. This ECCP mode etching apparatus can be applied even when, as the substrate, a substrate, the size of which exceeds 3 m of the tenth generation, is used, for example.

In order to etch the films into desired shapes, the etching condition (the amount of electric power applied to a coil-shaped electrode, the amount of electric power applied to an electrode on a substrate side, the temperature of the electrode on the substrate side, or the like) is adjusted as appropriate.

The etching conditions (such as an etchant, etching time, and temperature) are appropriately adjusted depending on the material so that the material can be etched into a desired shape.

As a material of the wiring layers 405a and 405b serving as source or drain electrode layers, an element selected from Al, Cr, Ta, Ti, Mo, and W; an alloy containing any of the above elements as its component; an alloy film containing these elements in combination; and the like can be given. Further, in the case where heat treatment is performed, the conductive film preferably has heat resistance against the heat treatment. Since use of Al alone brings disadvantages such as low heat resistance and a tendency to corrosion, aluminum is used in combination with a conductive material having heat resistance. As the conductive material having heat resistance, which is combined with Al, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

The gate insulating layer 402, the semiconductor layer 403, and the wiring layers 405a and 405b serving as source or drain electrode layers may be successively formed without being exposed to air. When they are successively formed without being exposed to air, each interface of stacked layers can be obtained, which are not contaminated by atmospheric components or impurity elements floating in air. Therefore, variation in the characteristics of the transistor can be reduced.

Note that the semiconductor layer 403 is partly etched so as to have a groove (a depressed portion).

As the insulating film 407 and the insulating film 409 which cover the transistor 420, an inorganic insulating film or an organic insulating film formed by a dry method or a wet method can be used. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like. A gallium oxide film can also be used as the insulating film 407.

Note that the siloxane-based resin corresponds to a resin including a Si—O—Si bond formed using a siloxane-based material as a starting material. The siloxane-based resin may include as a substituent an organic group (e.g., an alkyl group or an aryl group) or a fluoro group. In addition, the organic group may include a fluoro group. A siloxane-based resin is applied by a coating method and baked; thus, the insulating film 407 can be formed.

Alternatively, the insulating film 407 and the insulating film 409 may be formed by stacking plural insulating films formed using any of these materials. For example, an organic resin film may be stacked over an inorganic insulating film.

Further, with the use of a resist mask having regions with plural thicknesses (typically, two different thicknesses) which is formed using a multi-tone mask, the number of resist masks can be reduced, resulting in simplified process and lower costs.

Further, when the liquid crystal layer is formed using the liquid crystal composition which exhibits a blue phase, including the nematic liquid crystal including PPEP-5FCNF (abbreviation), and the chiral agent, high contrast can be provided. Thus, a high-definition liquid crystal display device with high visibility can be provided.

The liquid crystal composition which exhibits a blue phase has a short response time of 1 msec or less and is capable of high-speed response. Thus, a high-performance liquid crystal display device can be achieved.

Embodiment 3

Another example of an active matrix liquid crystal display device to which the invention disclosed in this specification is applied will be described with reference to FIGS. 4A and 4B and FIGS. 5A to 5D.

Figure 4A:
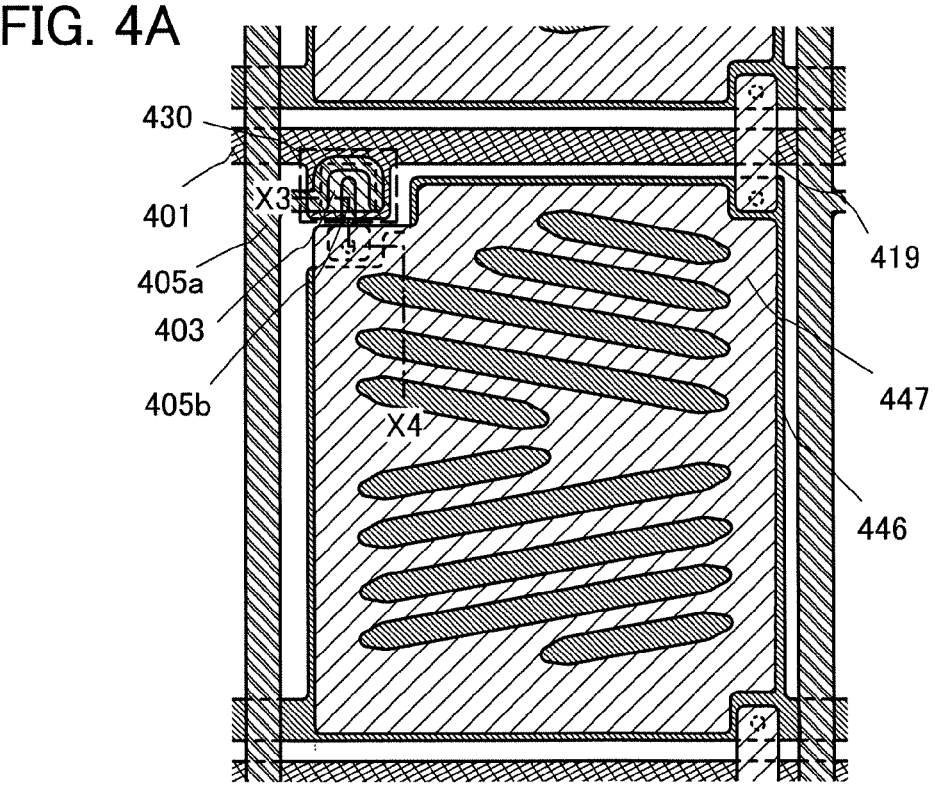
FIGS. 4A and 4B illustrate one mode of a liquid crystal display device.
Figure 4B:
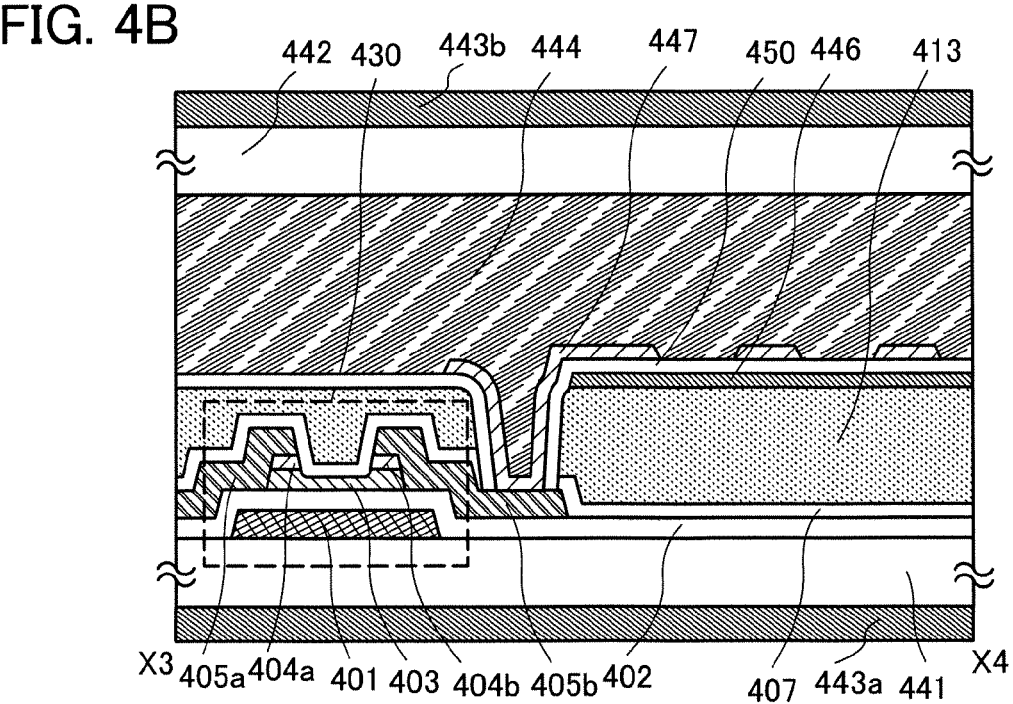

FIG. 4A is a plan view of a liquid crystal display device and illustrates one pixel. FIG. 4B is a cross-sectional view taken along line X3-X4 of FIG. 4A.

In FIG. 4A, a plurality of source wiring layers (including the wiring layer 405a) are provided in parallel to each other (extended in the vertical direction in the drawing) and apart from each other. A plurality of gate wiring layers (including a gate electrode layer 401) are provided to be extended in a direction generally perpendicular to the source wiring layers (the horizontal direction in the drawing) and apart from each other. Common wiring layers (common electrode layers) are provided adjacent to the respective plurality of gate wiring layers and extended in a direction generally parallel to the gate wiring layers, that is, in a direction generally perpendicular to the source wiring layers (the horizontal direction in the drawing). Roughly rectangular spaces are surrounded by the source wiring layers, the common wiring layers (common electrode layers), and the gate wiring layers, and a pixel electrode layer and a common electrode layer of a liquid crystal display device are provided in these spaces. A transistor 430 for driving the pixel electrode layer is provided at an upper left corner of the drawing. A plurality of pixel electrode layers and a plurality of transistors are arranged in matrix.

In the liquid crystal display device of FIGS. 4A and 4B, the first electrode layer 447 which is electrically connected to the transistor 430 serves as a pixel electrode layer, while a second electrode layer 446 which is electrically connected to the common electrode layer serves as a common electrode layer. Note that as shown in FIGS. 4A and 4B, the second electrode layer 446 also serves as the common wiring layer in the pixel; thus, adjacent pixels are electrically connected to each other with a common electrode layer 419. Note that a capacitor is formed by the pixel electrode layer and the common electrode layer. Although a common electrode layer can operate in a floating state (an electrically isolated state), the potential of the common electrode layer may be set to a fixed potential, preferably to a potential around a common potential (an intermediate potential of an image signal which is transmitted as data) in such a level as not to generate flickers.

A method in which the gray scale is controlled by generation of an electric field generally parallel (i.e., in a lateral direction) to a substrate to move liquid crystal molecules in a plane parallel to the substrate can be used. For such a method, an electrode structure used in an FFS mode illustrated in FIGS. 4A and 4B and FIGS. 5A to 5D can be employed.

In a lateral electric field mode such as an FFS mode, a first electrode layer (e.g., a pixel electrode layer with which voltage is controlled per pixel) having an opening pattern is located below a liquid crystal layer, and a second electrode layer (e.g., a common electrode layer with which common voltage is applied to all pixels) with a flat shape is located below the opening pattern. Therefore, the first electrode layer and the second electrode layer, one of which is a pixel electrode layer and the other of which is a common electrode layer, are formed over the first substrate 441, and the pixel electrode layer and the common electrode layer are provided so as to be stacked with an insulating film (or an interlayer insulating film) interposed therebetween. One of the pixel electrode layer and the common electrode layer is formed below the other one and has a flat-plate shape, and the other electrode layer is formed above the one and has various opening patterns such as a pattern with a bend portion or a comb-shaped portion. The first electrode layer 447 and the second electrode layer 446 are provided so as to have the same pattern and so as not to overlap with each other in order to generate an electric field between the electrodes.

In this embodiment, an electrode layer with an opening pattern (slit) is used as the first electrode layer 447 which is a pixel electrode layer, and an electrode layer in a flat-plate shape is used as the second electrode layer 446 which is a common electrode layer.

In order to generate an electric field between the first electrode layer 447 and the second electrode layer 446, the electrode layers are located such that the second electrode layer 446 in a flat-plate shape and the opening pattern (slit) of the first electrode layer 447 overlap with each other.

The liquid crystal layer 444 is formed using the liquid crystal composition which exhibits a blue phase, including the nematic liquid crystal including the compound (PPEP-5FCNF (abbreviation)) described in Embodiment 1, and the chiral agent. The liquid crystal composition may further include the photocurable resin and the photopolymerization initiator.

With an electric field formed between the first electrode layer 447 and the second electrode layer 446, a liquid crystal of the liquid crystal layer 444 is controlled. An electric field in a lateral direction is formed for the liquid crystal, so that liquid crystal molecules can be controlled using the electric field. That is, the liquid crystal molecules aligned to exhibit a blue phase can be controlled in a direction parallel to the substrate, whereby a wide viewing angle is obtained.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, a liquid crystal display device including the liquid crystal composition in a liquid crystal layer can have high reliability.

FIGS. 5A to 5D show examples of the first electrode layer 447 and the second electrode layer 446. As shown in FIGS. 5A to 5D, first electrode layers 447e to 447h and second electrode layers 446e to 446h are disposed so as to overlap with each other, and insulating films are formed between the first electrode layers 447e to 447h and the second electrode layers 446e to 446h, so that the first electrode layers 447e to 447h and the second electrode layers 446e to 446h are formed over different films.

Figure 5A:
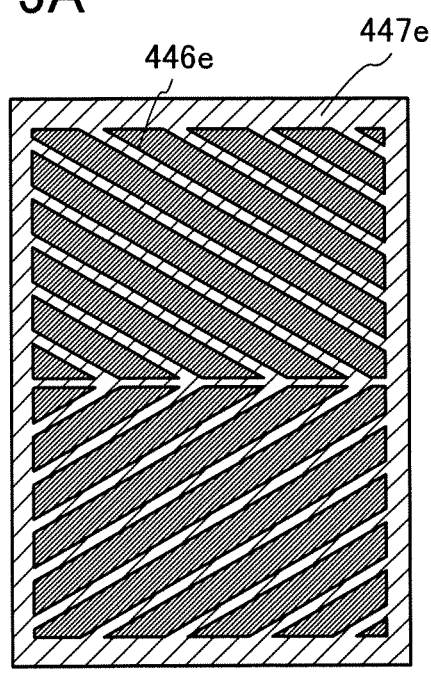
FIGS. 5A to 5D each illustrate one mode of the electrode structure of a liquid crystal display device.
Figure 5B:
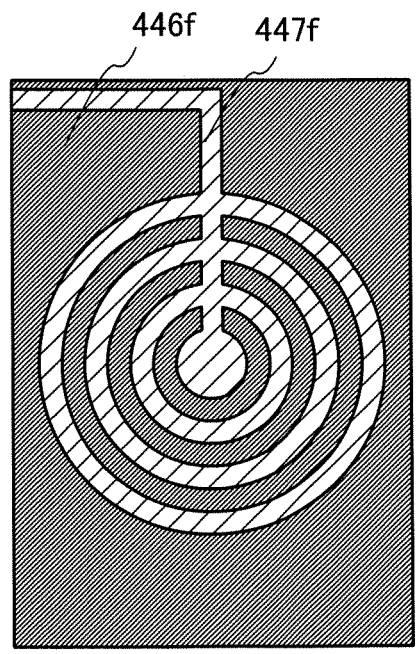
Figure 5C:
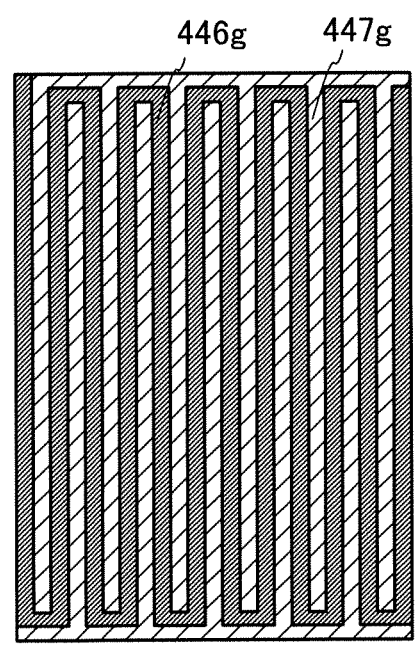
Figure 5D:
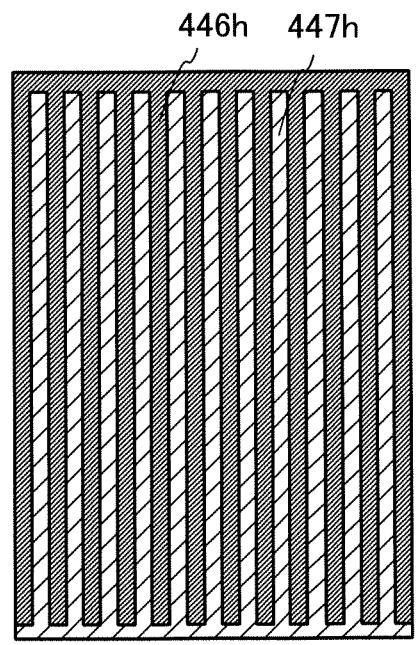

As shown in top views in FIGS. 5A to 5D, the first electrode layers 447e to 447h are formed in various shapes over the second electrode layers 446e to 446h. In FIG. 5A, the first electrode layer 447e is formed in a V-like shape over the second electrode layers 446e; in FIG. 5B, the first electrode layer 447f is formed in a concentric circular shape over the second electrode layers 446f; in FIG. 5C, the first electrode layer 447g is formed in a comb shape over the second electrode layer 446g and the electrode layers 447g and 446g are engaged with each other; and in FIG. 5D, the first electrode layer 447h is formed in a comb shape over the second electrode layer 446h.

The transistor 430 is an inverted staggered thin film transistor in which the gate electrode layer 401, the gate insulating layer 402, the semiconductor layer 403, a source region and a drain region 404a and 404b, and the wiring layers 405a and 405b which function as a source electrode layer and a drain electrode layer are formed over the first substrate 441 which has an insulating surface. The first electrode layer 447 is formed in the same layer as the gate electrode layer 401 over the first substrate 441 and is a flat-shaped electrode layer in the pixel.

As in the transistor 430, the source region and the drain region 404a and 404b may be provided between the semiconductor layer 403 and the wiring layers 405a and 405b which function as a source electrode layer and a drain electrode layer. The source region and the drain region 404a and 404b may be formed using a semiconductor layer whose resistance is lower than the semiconductor layer 403, or the like.

The insulating film 407 which covers the transistor 430 and is in contact with the semiconductor layer 403 is provided. The interlayer film 413 is provided over the insulating film 407, the second electrode layer 446 in a flat-plate shape is provided in a pixel over the interlayer film 413, and the first electrode layer 447 having an opening pattern is formed over the second electrode layer 446 with the insulating film 450 interposed therebetween. Thus, the first electrode layer 447 and the second electrode layer 446 are provided to overlap with each other with the insulating film 450 interposed therebetween.

Note that in this embodiment, with the use of light-transmitting electrode layers for the first electrode layer 447 and the second electrode layer 446, a transmissive liquid crystal display device can be obtained. Alternatively, with the use of a reflective electrode layer for the second electrode layer 446 in a flat-plate shape, a reflective liquid crystal display device can be obtained.

As described above, when the liquid crystal layer is formed using the liquid crystal composition which exhibits a blue phase, including the nematic liquid crystal including PPEP-5FCNF (abbreviation), and the chiral agent, high contrast can be provided. Thus, a high-definition liquid crystal display device with high visibility can be provided.

The liquid crystal composition which exhibits a blue phase has a short response time of 1 msec or less and is capable of high-speed response. Thus, a high-performance liquid crystal display device can be achieved.

Embodiment 4

Figure 6A:
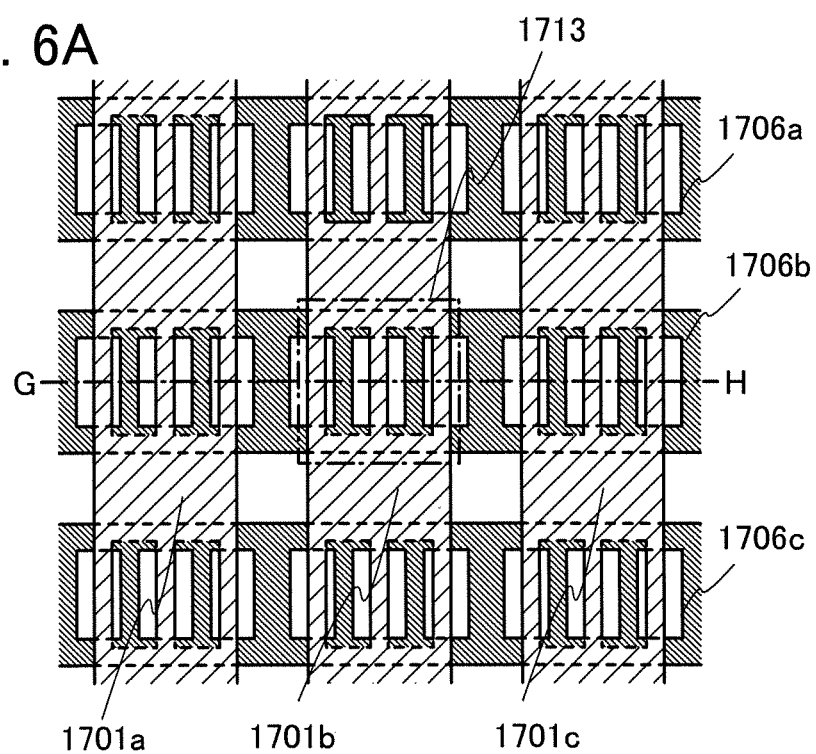
FIGS. 6A and 6B illustrate one mode of a liquid crystal display device.
Figure 6B:
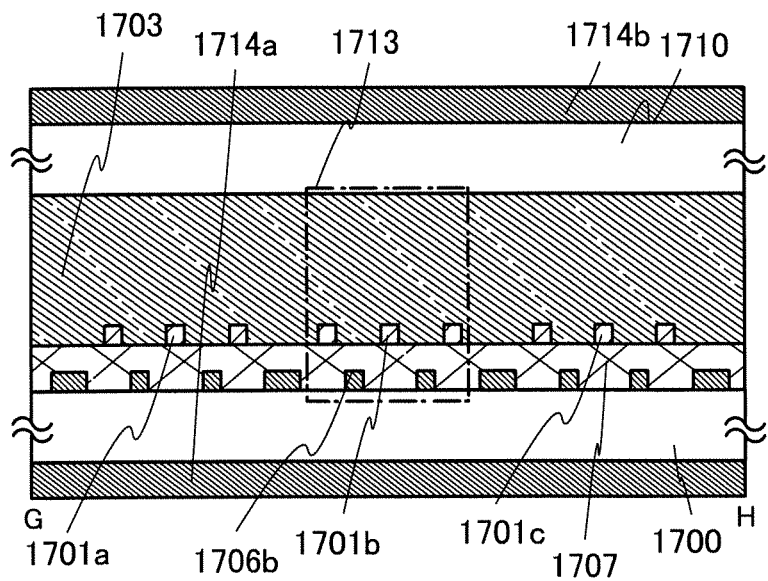

The invention disclosed in this specification can be applied to both a passive matrix liquid crystal display device and an active matrix liquid crystal display device. An example of a passive matrix liquid crystal display device is described with reference to FIGS. 6A and 6B. FIG. 6A is a top view of a liquid crystal display device, and FIG. 6B is a cross-sectional view taken along line G-H in FIG. 6A. In addition, in FIG. 6A, a liquid crystal layer 1703, a substrate 1710 which functions as a counter substrate, a polarizing plate 1714b, and the like are omitted and not shown; however, they are provided as illustrated in FIG. 6B.

FIGS. 6A and 6B illustrate the liquid crystal display device in which a substrate 1700 that is provided with a polarizing plate 1714a and the substrate 1710 that is provided with the polarizing plate 1714b are positioned to face each other with the liquid crystal layer 1703 including a liquid crystal composition which exhibits a blue phase interposed therebetween. The liquid crystal composition includes a nematic liquid crystal including a compound (PPEP-5FCNF (abbreviation)), and a chiral agent. Common electrode layers 1706a, 1706b, and 1706c, an insulating film 1707, and pixel electrode layers 1701a, 1701b, and 1701c are provided between the substrate 1700 and the liquid crystal layer 1703.

The pixel electrode layers 1701a, 1701b, and 1701c and the common electrode layers 1706a, 1706b, and 1706c each have a shape with an opening pattern which includes a rectangular opening (slit) in a pixel region of a liquid crystal element 1713.

The liquid crystal layer 1703 is formed using the liquid crystal composition which exhibits a blue phase, including the nematic liquid crystal including the compound (PPEP-5FCNF (abbreviation)) described in Embodiment 1, and the chiral agent. The liquid crystal composition may further include the photocurable resin and the photopolymerization initiator.

With an electric field formed between the pixel electrode layers 1701a, 1701b, and 1701c and the common electrode layers 1706a, 1706b, and 1706c, a liquid crystal of the liquid crystal layer 1703 is controlled. An electric field in a lateral direction is formed for the liquid crystal, so that liquid crystal molecules can be controlled using the electric field. That is, the liquid crystal molecules aligned to exhibit a blue phase can be controlled in a direction parallel to the substrate, whereby a wide viewing angle is obtained.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, a liquid crystal display device including the liquid crystal composition in a liquid crystal layer can have high reliability.

A coloring layer functioning as a color filter may be provided. The color filter may be provided on the liquid crystal layer 1703 side of the substrate 1700 and the substrate 1710; alternatively, the color filter may be provided between the substrate 1710 and the polarizing plate 1714b or between the substrate 1700 and the polarizing plate 1714a.

When full-color display is performed in the liquid crystal display device, the color filter may be formed of materials exhibiting red (R), green (G), and blue (B). When monochrome display is performed, the coloring layer may be omitted or formed of a material exhibiting at least one color. Note that the color filter is not always provided in the case where light-emitting diodes (LEDs) of RGB or the like are arranged in a backlight unit and a successive additive color mixing method (a field sequential method) in which color display is performed by time division is employed.

The pixel electrode layers 1701a, 1701b, and 1701c and the common electrode layers 1706a, 1706b and 1706c may be formed using one or more of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide including tungsten oxide, indium zinc oxide including tungsten oxide, indium oxide including titanium oxide, and indium tin oxide including titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

As described above, when the liquid crystal layer is formed using the liquid crystal composition which exhibits a blue phase, including the nematic liquid crystal including PPEP-5FCNF (abbreviation) and, the chiral agent, high contrast can be provided. Thus, a high-definition liquid crystal display device with high visibility can be provided.

The liquid crystal composition which exhibits a blue phase has a short response time of 1 msec or less and is capable of high-speed response. Thus, a high-performance liquid crystal display device can be achieved.

This embodiment can be implemented in appropriate combination with the structures described in the other embodiments.

Embodiment 5

The liquid crystal display device shown in any of Embodiments 1 to 4 can be provided with a light-blocking layer (a black matrix). Note that components in common with those in Embodiments 1 to 4 can be formed using a similar material and manufacturing method, and detailed description of like portions or portions having a similar function will be omitted.

The light-blocking layer can be provided on the inner side of a pair of substrates bonded to each other with a liquid crystal layer interposed therebetween (on the liquid crystal layer side), or on the outer side of the substrates (on the side opposite to the liquid crystal layer).

In the case where a light-blocking layer is provided on the inner side of a pair of substrates in a liquid crystal display device, the light-blocking layer can be formed on an element substrate side provided with a pixel electrode layer, or on a counter substrate side. The light-blocking layer can be additionally provided; alternatively, in the case of an active matrix liquid crystal display device shown in Embodiment 2 or Embodiment 3, the light-blocking layer can be formed as an interlayer film provided on the element substrate. In the liquid crystal display device of Embodiment 2 illustrated in FIGS. 4A and 4B, for example, a light-blocking layer can be formed as part of the interlayer film 413.

The light-blocking layer is made of a light-blocking material which reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which may be formed using chromium, molybdenum, nickel, titanium, cobalt, copper, tungsten, aluminum, or the like, for example.

There is no particular limitation on the method for forming the light-blocking layer, and a dry method such as an evaporation method, a sputtering method, or a CVD method or a wet method such as spin coating, dip coating, spray coating, a droplet discharging method (e.g., ink jetting, screen printing, or offset printing), may be used depending on the material. As needed, an etching method (dry etching or wet etching) may be employed to form a desired pattern.

In the case where the light-blocking layer is formed as part of the interlayer film 413, it is preferably made of a black organic resin.

In the case where the light-blocking layer is formed directly on the element substrate side as part of the interlayer film, the problem of misalignment between the light-blocking layer and a pixel region does not occur, whereby the formation region can be controlled more precisely even when a pixel has a minute pattern.

When the liquid crystal display device has a structure in which the light-blocking layer is formed over the element substrate, light emitted from the counter substrate side is not absorbed or blocked by the light-blocking layer in light irradiation for polymer stabilization treatment; thus, the entire liquid crystal layer can be uniformly irradiated with light. Thus, alignment disorder of a liquid crystal due to nonuniform photopolymerization, display unevenness due to the alignment disorder, and the like can be prevented.

In the liquid crystal display device, the light-blocking layer can be provided in an area overlapping with a semiconductor layer of a transistor or a contact hole, or between pixels.

The light-blocking layer provided in this manner can block light entering the semiconductor layer of the transistor; consequently, electric characteristics of the transistor can be prevented from varying due to incident light and can be stabilized. Further, with the light-blocking layer, light leakage to an adjacent pixel can be prevented, and display unevenness caused by light leakage or the like due to an alignment defect of liquid crystals which occurs easily over a contact hole can be made invisible. As a result, high definition and high reliability of the liquid crystal display device can be achieved.

This embodiment can be implemented in appropriate combination with the structures described in the other embodiments.

Embodiment 6

This embodiment shows an example of a liquid crystal display device performing color display. The liquid crystal display device shown in any of Embodiments 1 to 5 can be provided with a color filter to perform color display. Note that components in common with those in Embodiments 1 to 5 can be formed using a similar material and manufacturing method, and detailed description of like portions or portions having a similar function will be omitted.

In the case where a liquid crystal display device performs full-color display, a color filter can be made of materials which exhibit red (R), green (G), and blue (B). In the case of mono-color display other than monochrome display, a color filter can be made of a material which exhibits at least one color.

Specifically, the liquid crystal display device is provided with a coloring layer serving as a color filter layer. The color filter layer can be formed on the inner side of a pair of substrates bonded to each other with a liquid crystal layer interposed therebetween (on the liquid crystal layer side), or on the outer side of the substrates (on the side opposite to the liquid crystal layer).

First, description is made of the case where a color filter layer is provided on the inner side of a pair of substrates in a liquid crystal display device. The color filter layer can be formed on an element substrate side provided with a pixel electrode layer, or on a counter substrate side. The color filter layer can be additionally provided; alternatively, in the case of an active matrix liquid crystal display device shown in Embodiment 2 or Embodiment 3, the color filter layer can be formed as an interlayer film provided on an element substrate. In the case of the liquid crystal display device of Embodiment 2 illustrated in FIGS. 2A and 2B, for example, a chromatic-color light-transmitting resin layer serving as a color filter layer can be used as the interlayer film 413.

In the case where the interlayer film is formed directly on the element substrate side as the color filter layer, the problem of misalignment between the color filter layer and a pixel region does not occur, whereby the formation region can be controlled more precisely even when a pixel has a minute pattern. In addition, the same insulating layer serves as the interlayer film and the color filter layer, which brings advantages of process simplification and cost reduction.

Furthermore, when the liquid crystal display device has a structure in which the color filter layer is formed over the element substrate, light emitted from the counter substrate side is not absorbed by the color filter layer when the liquid crystal layer is irradiated with light for polymer stabilization; thus, the entire liquid crystal layer can be uniformly irradiated with light. Therefore, alignment disorder of liquid crystals due to nonuniform photopolymerization, display unevenness due to the alignment disorder, and the like can be prevented.

As the chromatic-color light-transmitting resin that can be used for the color filter layer, a photosensitive organic resin or a non-photosensitive organic resin can be used. A photosensitive organic resin layer is preferably used because the number of resist masks can be reduced and the process can be simplified.

Chromatic colors are colors except achromatic colors such as black, gray, and white. In order to function as a color filter, the coloring layer is made of a material which transmits only the chromatic color light. As the chromatic color, red, green, blue, or the like can be used. Alternatively, cyan, magenta, yellow, or the like may be used. "Transmitting only the chromatic color light" means that light transmitted through the coloring layer has a peak at the wavelength of the chromatic color light.

The thickness of the color filter layer may be controlled as appropriate in consideration of the relationship between the concentration of the coloring material to be included and the transmittance of light.

In the case where the thickness of the chromatic-color light-transmitting resin layer varies depending on the color or in the case where there is unevenness due to a light-blocking layer or a transistor, an insulating layer which transmits light in the visible wavelength range (a so-called colorless and transparent insulating layer) may be stacked for planarization. The improved planarization allows favorable coverage with a pixel electrode layer formed over the color filter layer, and a uniform gap (thickness) of a liquid crystal layer, whereby the visibility of the liquid crystal display device is increased and higher image quality can be achieved.

In the case where the color filter is provided on the outer side of a substrate, the color filter can be attached to the substrate with an adhesive layer or the like. If the color filter is provided on the outer side of a counter substrate, polymer stabilization of a blue phase is performed by light irradiation, and then the color filter is provided on the outer side of the counter substrate.

As a light source, a backlight, a sidelight, or the like may be used. Light from the light source passes through the color filter to the viewing side, so that color display can be performed. As a light source, a cold cathode tube or a white light-emitting diode can be used. In addition, an optical member such as a reflection plate, a diffusion plate, a polarizing plate, or a retardation plate can be provided.

This embodiment can be implemented in appropriate combination with the structures described in the other embodiments.

Thus, a color display function can be added to the liquid crystal display device with high contrast and low power consumption.

Embodiment 7

A liquid crystal display device having a display function can be manufactured by manufacturing transistors and using the transistors for a pixel portion and further for a driver circuit. When part or whole of the driver circuit is formed over the same substrate as the pixel portion with the use of the transistors, a system-on-panel can be obtained.

The liquid crystal display device includes a liquid crystal element (also referred to as a liquid crystal display element) as a display element.

The liquid crystal display device includes a panel in which a display element is sealed, and a module in which an IC or the like including a controller is mounted to the panel. This embodiment also relates to an element substrate, which corresponds to one mode before the display element is completed in a manufacturing process of the liquid crystal display device, and the element substrate is provided with a unit for supplying current to the display element in each of a plurality of pixels. Specifically, the element substrate may be in a state provided only with a pixel electrode of the display element, in a state after a conductive film to be a pixel electrode is formed and before the conductive film is etched to form the pixel electrode, or in any other state.

Note that the liquid crystal display device in this specification means an image display device, a display device, or a light source (including a lighting device). Further, the liquid crystal display device includes any of the following modules in its category: a module to which a connector such as a flexible printed circuit (FPC), a tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by chip on glass (COG) method.

Figure 7B:
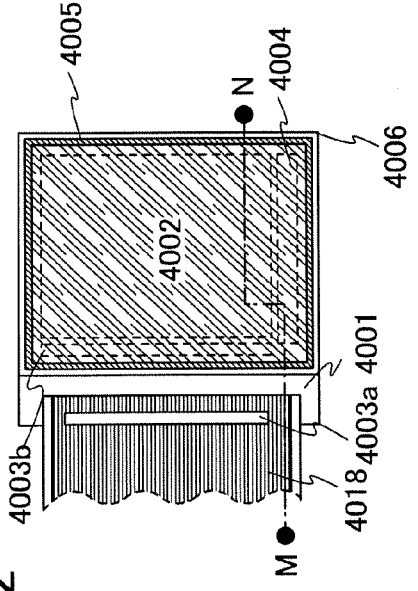
Figure 7B:
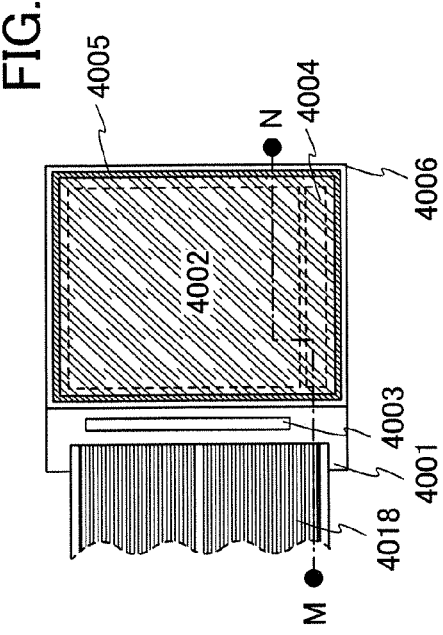
Figure 7B:
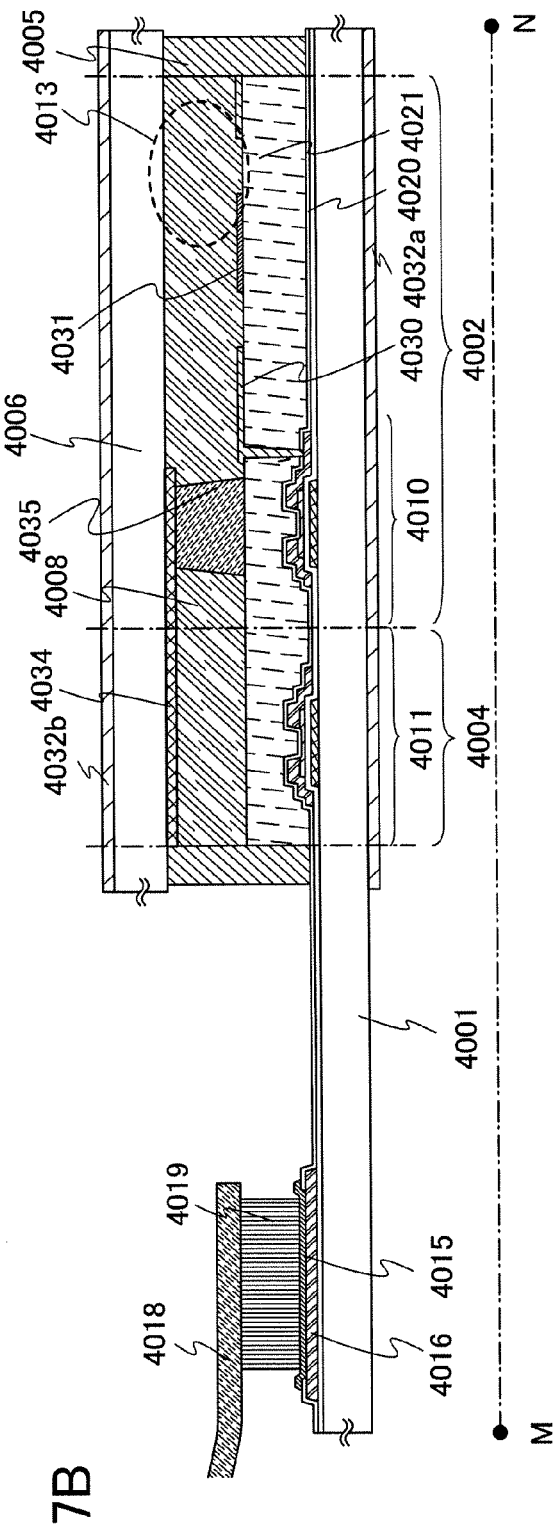

The appearance and cross section of a liquid crystal display panel, which is an embodiment of the liquid crystal display device, will be described with reference to FIGS. 7A1, 7A2, and 7B. FIGS. 7A1 and 7A2 are top views of a panel in which transistors 4010 and 4011, and a liquid crystal element 4013 are sealed between a first substrate 4001 and a second substrate 4006 with a sealant 4005. FIG. 7B is a cross-sectional view taken along line M-N of FIGS. 7A1 and 7A2.

The sealant 4005 is provided to surround a pixel portion 4002 and a scan line driver circuit 4004 that are provided over the first substrate 4001. The second substrate 4006 is provided over the pixel portion 4002 and the scan line driver circuit 4004. Therefore, the pixel portion 4002 and the scan line driver circuit 4004 are sealed together with a liquid crystal layer 4008, by the first substrate 4001, the sealant 4005, and the second substrate 4006.

In FIG. 7A1, a signal line driver circuit 4003 that is formed using a single crystal semiconductor film or a polycrystalline semiconductor film over a substrate separately prepared is mounted in a region different from the region surrounded by the sealant 4005 over the first substrate 4001. FIG. 7A2 illustrates an example in which part of a signal line driver circuit is formed over the first substrate 4001 with the use of a transistor. A signal line driver circuit 4003b is formed over the first substrate 4001 and a signal line driver circuit 4003a that is formed using a single crystal semiconductor film or a polycrystalline semiconductor film over a substrate separately prepared is mounted on the first substrate 4001.

Note that there is no particular limitation on the connection method of a driver circuit which is separately formed, and COG, wire bonding, TAB, or the like can be used. FIG. 7A1 illustrates an example of mounting the signal line driver circuit 4003 by COG, and FIG. 7A2 illustrates an example of mounting the signal line driver circuit 4003 by TAB.

The pixel portion 4002 and the scan line driver circuit 4004 provided over the first substrate 4001 each include a plurality of transistors. FIG. 7B illustrates the transistor 4010 included in the pixel portion 4002 and the transistor 4011 included in the scan line driver circuit 4004. An insulating layer 4020 and an interlayer film 4021 are provided over the transistors 4010 and 4011.

The transistor shown in any of Embodiment 2 or Embodiment 3 can be applied to the transistors 4010 and 4011.

Further, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Further, the potential of the conductive layer may be GND or 0 V, or the conductive layer may be in a floating state.

A pixel electrode layer 4030 and a common electrode layer 4031 are provided over the interlayer film 4021, and the pixel electrode layer 4030 is electrically connected to the transistor 4010. The liquid crystal element 4013 includes the pixel electrode layer 4030, the common electrode layer 4031, and the liquid crystal layer 4008. Note that a polarizing plate 4032a and a polarizing plate 4032b are provided on the outer sides of the first substrate 4001 and the second substrate 4006, respectively. In this embodiment, the pixel electrode layer 4030 and the common electrode layer have an opening pattern as shown in FIGS. 2A and 2B of Embodiment 2; however, one of the pixel electrode layer and the common electrode layer may be an electrode layer in a flat-plate shape as in Embodiment 3. The structures of the pixel electrode layer and the common electrode layer shown in any of Embodiments 2 to 4 can be used for the pixel electrode layer and the common electrode layer.

The liquid crystal layer 4008 is formed using the liquid crystal composition which exhibits a blue phase, including the nematic liquid crystal including the compound (PPEP-5FCNF (abbreviation)) described in Embodiment 1, and the chiral agent. The liquid crystal composition may further include the photocurable resin and the photopolymerization initiator.

With an electric field formed between the pixel electrode layer 4030 and the common electrode layer 4031, a liquid crystal of the liquid crystal layer 4008 is controlled. An electric field in a lateral direction is formed for the liquid crystal, so that liquid crystal molecules can be controlled using the electric field. That is, the liquid crystal molecules aligned to exhibit a blue phase can be controlled in a direction parallel to the substrate, whereby a wide viewing angle is obtained.

The liquid crystal composition which exhibits a blue phase, including the nematic liquid crystal including PPEP-5FCNF (abbreviation), and the chiral agent is a liquid crystal composition with a wide temperature range where a blue phase is exhibited. Therefore, the liquid crystal composition is not easily changed in characteristics and is stable even when being used for a variety of applications accompanied by temperature change. Thus, a liquid crystal display device including the liquid crystal composition in a liquid crystal layer can have high reliability.

As the first substrate 4001 and the second substrate 4006, a glass substrate, a plastic substrate, or the like having light-transmitting properties can be used. As the plastic substrate, a fiberglass-reinforced plastics (FRP) plate, a polyvinyl fluoride (PVF) film, a polyester film, or an acrylic resin film can be used. Further, a sheet in which aluminum foil is sandwiched between PVF films or polyester films can also be used.

A columnar spacer denoted by reference numeral 4035 is obtained by selective etching of an insulating film and is provided in order to control the thickness (a cell gap) of the liquid crystal layer 4008. Alternatively, a spherical spacer may be used. In the liquid crystal display device including the liquid crystal layer 4008, the thickness (the cell gap) of the liquid crystal layer 4008 is preferably greater than or equal to 1 μm and less than or equal to 20 μm. In this specification, the thickness of a cell gap refers to the maximum thickness (film thickness) of a liquid crystal layer.

Although FIGS. 7A1, 7A2, and 7B show an example of a transmissive liquid crystal display device, an embodiment of the present invention can also be applied to a semi-transmissive reflective liquid crystal display device and a reflective liquid crystal display device.

Further, FIGS. 7A1, 7A2, and 7B illustrate an example in which polarizing plates are provided on the outer side (the viewing side) of the substrates; however, the polarizing plates may be provided on the inner side of the substrates. Whether the polarizing plate is provided on the inner side or the outer side may be determined as appropriate depending on the material of the polarizing plate and conditions of the manufacturing process. Furthermore, a light-blocking layer functioning as a black matrix may be provided.

A color filter layer or a light-blocking layer may be formed as part of the interlayer film 4021. In FIGS. 7A1, 7A2, and 7B, a light-blocking layer 4034 is provided on the second substrate 4006 side so as to cover the transistors 4010 and 4011. By providing the light-blocking layer 4034, the contrast can be increased and the transistors can be stabilized more.

The transistors can be, but is not necessarily, covered with the insulating layer 4020 which functions as a protective film of the transistors.

Note that the protective film is provided to prevent entry of contaminant impurities floating in air, such as an organic substance, a metal substance, or moisture, and is preferably a dense film. The protective film may be formed by a sputtering method to have a single-layer structure or a multi-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Further, in the case of further forming a light-transmitting insulating layer as a planarization insulating film, the light-transmitting insulating layer can be made of an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films made of any of these materials.

There is no particular limitation on the method for forming the interlayer layers to be stacked, and the following method can be employed depending on the material: a sputtering method, spin coating, dip coating, spray coating, droplet discharging (such as ink jetting, screen printing, or offset printing), roll coating, curtain coating, knife coating, or the like.

The pixel electrode layer 4030 and the common electrode layer 4031 can be made of a light-transmitting conductive material such as indium oxide including tungsten oxide, indium zinc oxide including tungsten oxide, indium oxide including titanium oxide, indium tin oxide including titanium oxide, indium tin oxide (ITO), indium zinc oxide, or indium tin oxide to which silicon oxide is added.

The pixel electrode layer 4030 and the common electrode layer 4031 can also be formed using one or more of the following: metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

Alternatively, the pixel electrode layer 4030 and the common electrode layer 4031 can be made of a conductive composition including a conductive high molecule (also referred to as a conductive polymer).

A variety of signals and potentials are supplied from an FPC 4018 to the signal line driver circuit 4003 that is formed separately, and the scan line driver circuit 4004 or the pixel portion 4002.

Further, since the transistor is easily broken by static electricity or the like, a protection circuit for protecting the driver circuit is preferably provided over the same substrate for a gate line or a source line. The protection circuit is preferably formed using a nonlinear element.

In FIGS. 7A1, 7A2, and 7B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal included in the FPC 4018 through an anisotropic conductive film 4019.

Although FIGS. 7A1, 7A2, and 7B show an example in which the signal line driver circuit 4003 is formed separately and mounted on the first substrate 4001, an embodiment of the present invention is not limited to this structure. The scan line driver circuit may be formed separately and then mounted, or only part of the signal line driver circuit or part of the scan line driver circuit may be formed separately and then mounted.

As described above, when the liquid crystal layer is formed using the liquid crystal composition which exhibits a blue phase, including the nematic liquid crystal including PPEP-5FCNF (abbreviation), and the chiral agent, high contrast can be provided. Thus, a high-definition liquid crystal display device with high visibility can be provided.

The liquid crystal composition which exhibits a blue phase has a short response time of 1 msec or less and is capable of high-speed response. Thus, a high-performance liquid crystal display device can be achieved.

This embodiment can be implemented in appropriate combination with the structures described in the other embodiments.

Embodiment 8

The liquid crystal display device disclosed in this specification can be applied to a variety of electronic devices (including game machines). Examples of the electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a personal digital assistant, an audio reproducing device, and a large-sized game machine such as a pachinko machine.

Figure 8A:
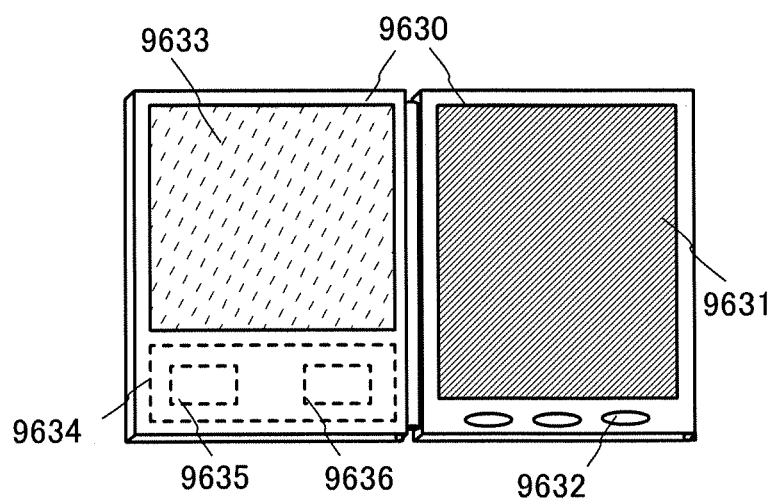
FIGS. 8A and 8B illustrate an electronic device.

FIG. 8A illustrates an electronic book reader (also referred to as an e-book reader) which can include housings 9630, a display portion 9631, operation keys 9632, a solar cell 9633, and a charge and discharge control circuit 9634. The electronic book reader illustrated in FIG. 8A has a function of displaying various kinds of data (e.g., a still image, a moving image, and a text image) on the display portion, a function of displaying a calendar, a date, the time, or the like on the display portion, a function of operating or editing the data displayed on the display portion, a function of controlling processing by various kinds of software (programs), and the like. Note that in FIG. 8A, the charge and discharge control circuit 9634 has a battery 9635 and a DCDC converter (hereinafter, abbreviated to as a converter) 9636 as an example. The liquid crystal display device shown in any of Embodiments 1 to 7 can be applied to the display portion 9631, whereby an electronic book reader with high contrast, high visibility, and low power consumption can be provided.

In the case of using a semi-transmissive reflective or reflective liquid crystal display device as the display portion 9631 in the structure illustrated in FIG. 8A, the electronic book reader may be used in a comparatively bright environment. This case is preferable because power generation by the solar cell 9633 and charge by the battery 9635 can be effectively performed. The solar cell 9633 can be provided on a space (a surface or a rear surface) of the housing 9630 as appropriate, which is also preferable because the battery 9635 can be efficiently charged. When a lithium ion battery is used as the battery 9635, there is an advantage of downsizing or the like.

Figure 8B:
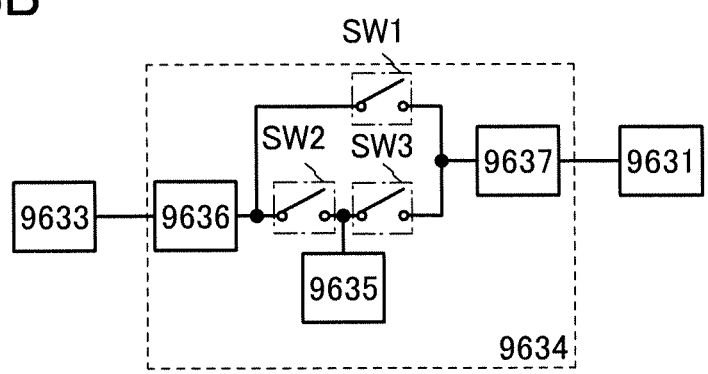

The configuration and operation of the charge and discharge control circuit 9634 illustrated in FIG. 8A will be described with reference to a block diagram of FIG. 8B. The solar cell 9633, the battery 9635, the converter 9636, a converter 9637, switches SW1 to SW3, and the display portion 9631 are illustrated in FIG. 8B, and the battery 9635, the converter 9636, the converter 9637, and the switches SW1 to SW3 correspond to the charge and discharge control circuit 9634.

First, an example of the operation in the case where power is generated by the solar cell 9633 using external light is described. The power generated by the solar cell 9633 is raised or lowered by the converter 9636 so as to be a voltage for charging the battery 9635. Then, when the power from the solar cell 9633 is used for the operation of the display portion 9631, the switch SW1 is turned on and the power is raised or lowered by the converter 9637 so as to be a voltage needed for the display portion 9631. When display on the display portion 9631 is not performed, the switch SW1 is turned off and the switch SW2 is turned on so that charge of the battery 9635 can be performed.

Next, the operation in the case where power is not generated by the solar cell 9633 using external light is described. The power stored in the battery 9635 is raised or lowered by the converter 9637 by turning on the switch SW3. Then, power from the battery 9635 is used for the operation of the display portion 9631.

Although the solar cell 9633 is shown as an example of a unit for charge, charge of the battery 9635 may be performed with another means. In addition, a combination of the solar cell 9633 and another unit for charge may be used.

Figure 9A:
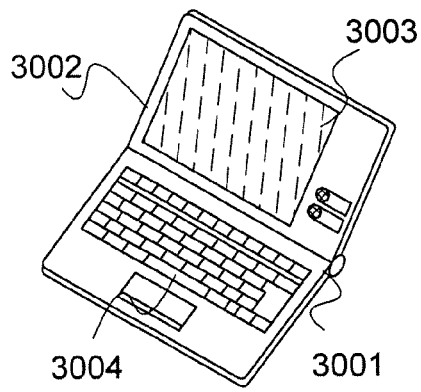
FIGS. 9A to 9F each illustrate an electronic device.

FIG. 9A illustrates a laptop personal computer, which includes a main body 3001, a housing 3002, a display portion 3003, a keyboard 3004, and the like. The liquid crystal display device shown in any of Embodiments 1 to 7 can be applied to the display portion 3003, whereby a highly reliable laptop personal computer with high contrast and high visibility can be provided.

Figure 9B:
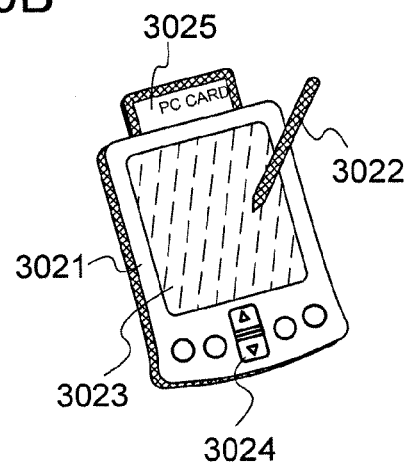

FIG. 9B is a personal digital assistant (PDA) including a display portion 3023, an external interface 3025, an operation button 3024, and the like in a main body 3021. In addition, a stylus 3022 is provided as an accessory for operation. The liquid crystal display device shown in any of Embodiments 1 to 7 can be applied to the display portion 3023, whereby a highly reliable personal digital assistant (PDA) with high contrast and high visibility can be provided.

Figure 9C:
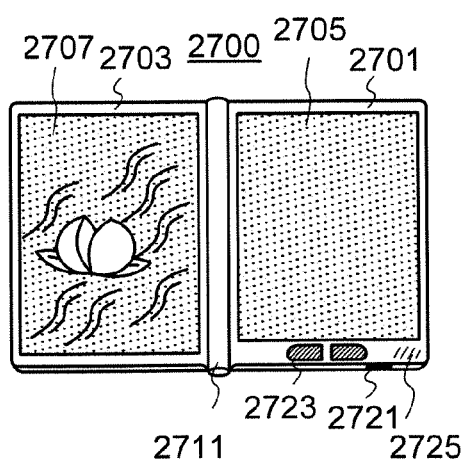

FIG. 9C illustrates an example of an electronic book reader. For example, an electronic book reader 2700 includes two housings, a housing 2701 and a housing 2703. The housing 2701 and the housing 2703 are combined with a hinge 2711 so that the electronic book reader 2700 can be opened and closed with the hinge 2711 as an axis. With such a structure, the electronic book reader 2700 can operate like a paper book.

A display portion 2705 and a display portion 2707 are incorporated in the housing 2701 and the housing 2703, respectively. The display portion 2705 and the display portion 2707 may display one image or different images. In the structure where different images are displayed on the above display portions, for example, the right display portion (the display portion 2705 in FIG. 9C) can display text and the left display portion (the display portion 2707 in FIG. 9C) can display images. The liquid crystal display device shown in any of Embodiments 1 to 7 can be applied to the display portion 2705 and the display portion 2707, whereby a highly reliable electronic book reader 2700 with high contrast and high visibility can be provided.

FIG. 9C illustrates the example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may be provided on the surface of the housing, on which the display portion is provided. Furthermore, an external connection terminal (an earphone terminal, a USB terminal, or the like), a recording medium insertion portion, and the like may be provided on the back surface or the side surface of the housing. Moreover, the electronic book reader 2700 may have a function of an electronic dictionary.

The electronic book reader 2700 may have a configuration capable of wirelessly transmitting and receiving data. Through wireless communication, desired book data or the like can be purchased and downloaded from an electronic book server.

Figure 9D:
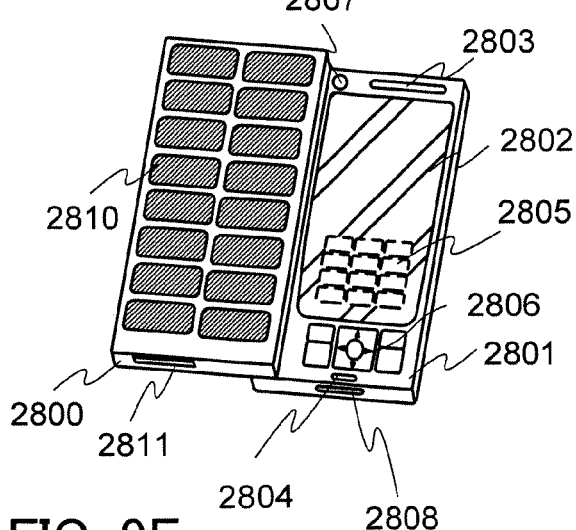

FIG. 9D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 for charging the mobile phone, an external memory slot 2811, and the like. Further, an antenna is incorporated in the housing 2801. The liquid crystal display device shown in any of Embodiments 1 to 7 can be applied to the display panel 2802, whereby a highly reliable mobile phone with high contrast and high visibility can be provided.

The display panel 2802 is provided with a touch panel. A plurality of operation keys 2805 which are displayed as images are illustrated by dashed lines in FIG. 9D. Note that a boosting circuit by which a voltage output from the solar cell 2810 is increased to be sufficiently high for each circuit is also included.

In the display panel 2802, the display direction can be appropriately changed depending on a usage pattern. Further, the mobile phone is provided with the camera lens 2807 on the same surface as the display panel 2802, and thus it can be used as a video phone. The speaker 2803 and the microphone 2804 can be used for videophone calls, recording and playing sound, and the like as well as voice calls. Moreover, the housing 2800 and the housing 2801 developed as illustrated in FIG. 9D can be slid so that one is lapped over the other; thus, the size of the mobile phone can be reduced, which makes the mobile phone suitable for being carried.

The external connection terminal 2808 can be connected to an AC adapter and various types of cables such as a USB cable, and charging and data communication with a personal computer or the like are possible. Moreover, a large amount of data can be stored in a storage medium inserted into the external memory slot 2811 and can be moved.

In addition to the above functions, an infrared communication function, a television reception function, or the like may be provided.

Figure 9E:
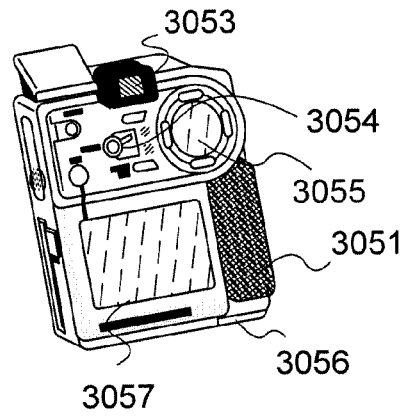

FIG. 9E illustrates a digital video camera which includes a main body 3051, a display portion A 3057, an eyepiece 3053, an operation switch 3054, a display portion B 3055, a battery 3056, and the like. The liquid crystal display device shown in any of Embodiments 1 to 7 can be applied to the display portion A 3057 and the display portion B 3055, whereby a highly reliable digital video camera with high contrast and high visibility can be provided.

Figure 9F:
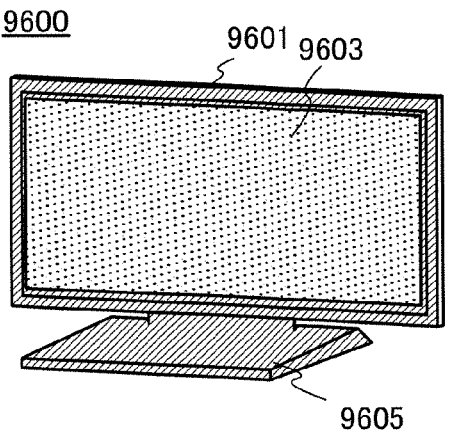

FIG. 9F illustrates an example of a television set. In a television set 9600, a display portion 9603 is incorporated in a housing 9601. The display portion 9603 can display images. Here, the housing 9601 is supported by a stand 9605. The liquid crystal display device shown in any of Embodiments 1 to 7 can be applied to the display portion 9603, whereby a highly reliable television set 9600 with high contrast and high visibility can be provided.

The television set 9600 can be operated by an operation switch of the housing 9601 or a separate remote controller. Further, the remote controller may be provided with a display portion for displaying data output from the remote controller.

Note that the television set 9600 is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) data communication can be performed.

This embodiment can be implemented in appropriate combination with the structures described in the other embodiments.

Example 1

In this example, a liquid crystal element as an embodiment of the present invention, and a comparative liquid crystal element as a comparative example to which the present invention was not applied were manufactured, and the characteristics of the elements were evaluated.

Table 1 shows the structure of a liquid crystal composition used for the liquid crystal element manufactured in this example. Table 2 shows the structure of a liquid crystal composition used for the comparative liquid crystal element. In Table 1 and Table 2, the mixture ratios are all represented in weight ratios.

TABLE 1

| Material | | Weight (mg) | Proportion (wt %) |
|---|---|---|---|
| Liquid crystal 1 | MDA-00-3506 | 152.89 | 24.78 |
| Liquid crystal 2 | NEDO LC-C | 101.83 | 16.50 |
| Liquid crystal 3 | CPP-3FF | 102.24 | 16.57 |
| Liquid crystal 4 | PEP-5CNF | 76.44 | 12.39 |
| Liquid crystal 5 | PPEP-5FCNF | 77.6 | 12.58 |
| Chiral agent | ISO-(6OBA)$_2$ | 53.8 | 8.72 |
| Liquid crystalline ultraviolet curable resin | RM257 | 24.8 | 4.02 |
| Non-liquid-crystalline ultraviolet curable resin | DMeAc | 24.5 | 3.97 |
| Polymerization initiator | DMPAP | 2.9 | 0.47 |
| Total | | 617.00 | 100.00 |

TABLE 2

| Material | | Weight (mg) | Proportion (wt %) |
|---|---|---|---|
| Liquid crystal 1 | MDA-00-3506 | 139.40 | 24.81 |
| Liquid crystal 2 | NEDO LC-C | 93.62 | 16.66 |
| Liquid crystal 3 | CPP-3FF | 92.86 | 16.53 |
| Liquid crystal 4 | PEP-5CNF | 139.92 | 24.90 |
| Chiral agent | ISO-(6OBA)$_2$ | 48.8 | 8.68 |
| Liquid crystalline ultraviolet curable resin | RM257 | 23.1 | 4.11 |
| Non-liquid-crystalline ultraviolet curable resin | DMeAc | 22.3 | 3.97 |
| Polymerization initiator | DMPAP | 1.9 | 0.34 |
| Total | | 561.90 | 100.00 |

In the liquid crystal element and the comparative liquid crystal element, the following components were used: MDA-00-3506 (produced by Merck Ltd.) as a liquid crystal 1, NEDO LC-C (produced by Merck Ltd.) as a liquid crystal 2, CPP-3FF (abbreviation) as a liquid crystal 3, PEP-5CNF (abbreviation) as a liquid crystal 4, ISO-(6OBA)$_2$ (abbreviation) as a chiral agent, RM257 (produced by Merck Ltd.) as a liquid crystalline ultraviolet curable resin; dodecyl 2-methylacrylate (abbreviated as DMeAc and produced by Tokyo Chemical Industry Co., Ltd.) as a non-liquid-crystalline ultraviolet curable resin, and DMPAP (which is an abbreviation and produced by Tokyo Chemical Industry Co., Ltd.) as a polymerization initiator. The structural formulae of CPP-3FF (abbreviation) as the liquid crystal 3, PEP-5CNF (abbreviation) as the liquid crystal 4, ISO-(6OBA)$_2$ (abbreviation) as the chiral agent, RM257 (produced by Merck Ltd.) as the liquid crystalline ultraviolet curable resin, dodecyl 2-methylacrylate (abbreviated as DMeAc and produced by Tokyo Chemical Industry Co., Ltd.) as the non-liquid-crystalline ultraviolet curable resin, and DMPAP (which is an abbreviation and produced by Tokyo Chemical Industry Co., Ltd.) as the polymerization initiator, which were used in this example, are shown below.

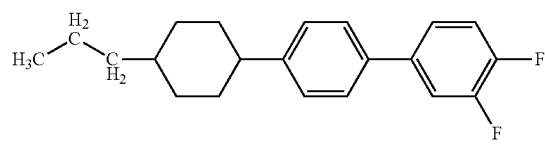

CPP-3FF

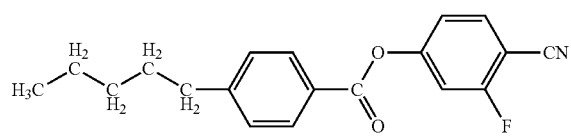

PEP-5CNF

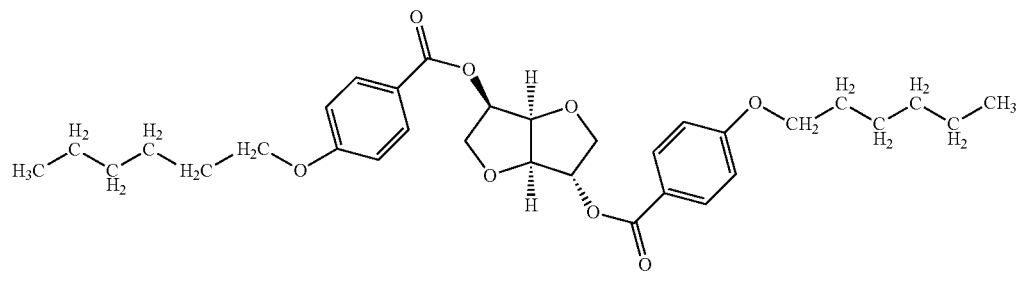

ISO-(6OBA)$_2$

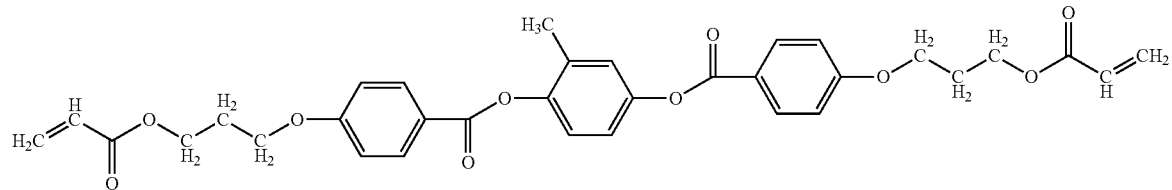

RM257

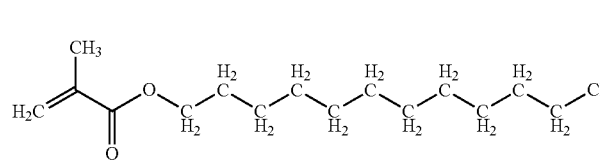

DMeAc

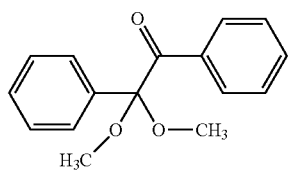

DMPAP

In the liquid crystal element shown in Table 1, a liquid crystal composition including a nematic liquid crystal including PPEP-5FCNF (abbreviation) which is a compound represented by a structural formula (100) below was further used as a liquid crystal 5.

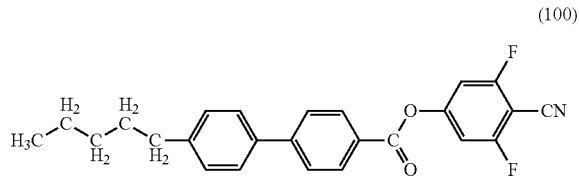 [SMILES: CCCCCc1ccc(-c2ccc(C(=O)Oc3cc(F)c(C#N)c(F)c3)cc2)cc1]

(100)

The liquid crystal element and the comparative liquid crystal element were manufactured as follows: a glass substrate provided with a pixel electrode layer and a common electrode layer which were processed into comb shape as shown in FIG. 3D and a glass substrate as a counter substrate were bonded together with a gap (4 μm) therebetween with the use of a sealing material, and then, each liquid crystal composition shown in Table 1 or Table 2 was injected between the substrates. The pixel electrode layer and the common electrode layer were formed using indium tin oxide including silicon oxide (ITSO) by a sputtering method. The pixel electrode layer and the common electrode layer were each formed to a thickness of 110 nm. The width of each of the pixel electrode layer and the common electrode layer was 2 and the distance between the pixel electrode layer and the common electrode layer was 2 μm. Further, ultraviolet and heat curable sealing material was used as the sealing material. As a curing treatment, an ultraviolet (irradiance of 100 mW/cm$^2$) irradiation treatment was performed for 90 seconds, and then, a heat treatment was performed at 120° C. for 1 hour.

The polymer stabilization evaluation of the liquid crystal element and the comparative liquid crystal element was performed. For the polymer stabilization evaluation, a polarizing microscope (MX-50 produced by Olympus Corporation) and a temperature controller (MK1000 produced by Instec, Inc.) were used.

The liquid crystal compositions of the liquid crystal element and the comparative liquid crystal element were made to exhibit an isotropic phase. Then, the liquid crystal element and the comparative liquid crystal element were observed with the polarizing microscope while the temperature was decreased by 1.0° C. per minute with the temperature controller. In this manner, the temperature range where the liquid crystal compositions exhibit a blue phase was measured.

Further, each of the liquid crystal element and the comparative liquid crystal element was set at arbitrary constant temperature within the temperature range where a blue phase was exhibited, and irradiation with an ultraviolet (wavelength of 365 nm and irradiance of 1.5 mW/cm$^2$) was performed for 30 minutes, whereby polymer stabilization treatment was performed.

The measurement conditions of the observation were as follows. In the polarizing microscope, a measurement mode was a reflective mode; polarizers were in crossed nicols; and the magnification was 200 times.

The liquid crystal element prior to the polymer stabilization treatment exhibited a blue phase within a temperature range, the upper limit of which was 49.6° C. and the lower limit of which was 41.8° C. However, the liquid crystal element subsequent to the polymer stabilization treatment exhibited a blue phase within a temperature range, the upper limit of which was increased to 65.2° C., and a blue phase was also observed even at 10° C. Therefore, as for the liquid crystal element, it was confirmed that the temperature range where a blue phase was exhibited was able to be greatly widened by the polymer stabilization treatment.

On the other hand, the comparative liquid crystal element prior to the polymer stabilization treatment exhibited a blue phase within a temperature range, the upper limit of which was 34.0° C. and the lower limit of which was 26.3° C. The comparative liquid crystal element subsequent to the polymer stabilization treatment exhibited a blue phase at 10° C., but the upper limit of the temperature range was 42.5° C., which was not increased so much. Thus, the temperature range where a blue phase was exhibited was not widened as compared to that of the liquid crystal element.

Therefore, it is shown that the liquid crystal element of this example, which is an embodiment of the present invention, exhibits a blue phase within a wide temperature range.

Further, voltage was applied to the liquid crystal element and the comparative liquid crystal element, and the transmittance and the contrast with respect to an applied voltage were evaluated. The characteristic evaluation was performed with a liquid crystal evaluation system (LCD-7200 produced by Otsuka Electronics Co., Ltd.) under the following conditions. A halogen lamp was used as a light source, and the temperature was set to room temperature. The liquid crystal element and the comparative liquid crystal element were sandwiched between polarizers in crossed nicols.

Figure 10:
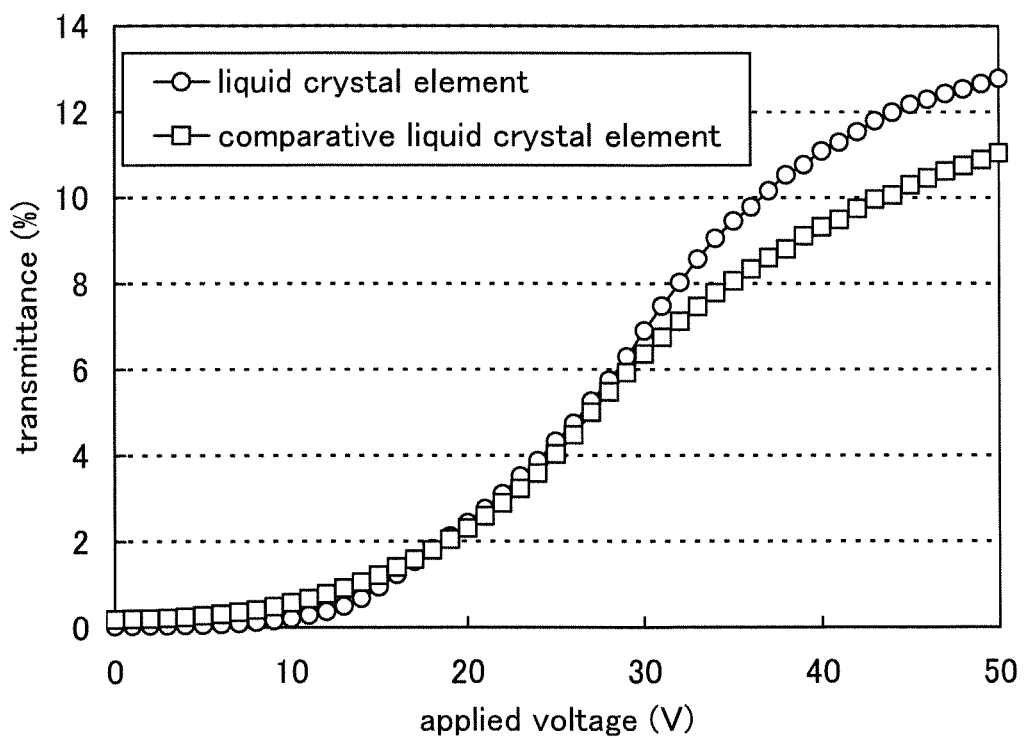
FIG. 10 is a graph illustrating the relation between an applied voltage and transmittance in a liquid crystal element.
Figure 11:
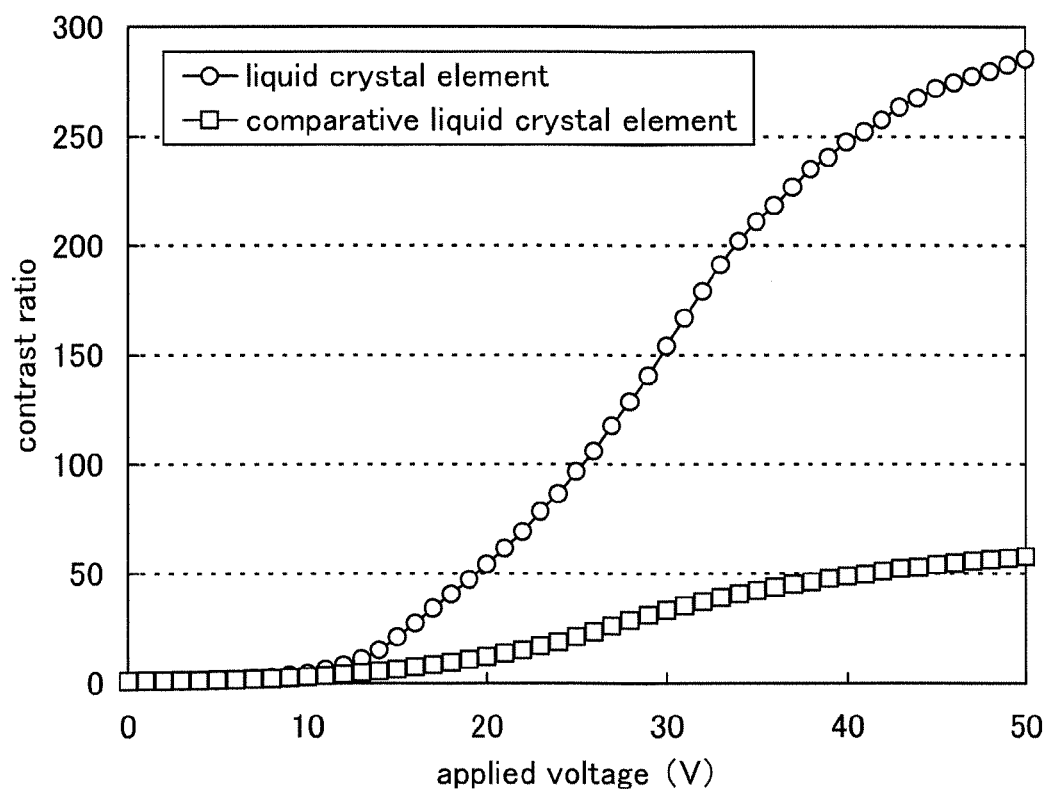
FIG. 11 is a graph illustrating the relation between an applied voltage and a contrast ratio in a liquid crystal element.

FIG. 10 shows the relation between the applied voltage and the transmittance of the liquid crystal element and the comparative liquid crystal element. FIG. 11 shows the relation between the applied voltage and the contrast ratio of the liquid crystal element and the comparative liquid crystal element. The contrast ratio with respect to the applied voltage in FIG. 11 was calculated from the transmittance in FIG. 10. Specifically, the contrast ratio at an applied voltage of 0 V was set to 1, and the transmittance at each applied voltage was divided by the transmittance at an applied voltage of 0 V. In this manner, the contrast ratio was calculated. Note that in FIG. 10 and FIG. 11, the relation concerning the liquid crystal element is indicated by white dots, and the relation concerning the comparative liquid crystal element is indicated by white squares.

As shown in FIG. 10, the transmittance with respect to the applied voltage of the liquid crystal element is higher than that of the comparative liquid crystal element. Further, the transmittance at an applied voltage of 0 V of the liquid crystal element is lower than that of the comparative liquid crystal element. The difference between the liquid crystal element and the comparative liquid crystal element is remarkable in the contrast ratio of FIG. 11. At the same applied voltage, the contrast ratio of the liquid crystal element is higher than that of the comparative liquid crystal element.

As described above, it can be confirmed that a liquid crystal composition including a nematic liquid crystal including PPEP-5FCNF (abbreviation) of this example has a wide temperature range where a blue phase is exhibited.

Further, a liquid crystal element including the liquid crystal composition of this example has high contrast, and thus, a liquid crystal display device including the liquid crystal element can provide a higher contrast.

Example 2

A synthetic method of 4-(4-n-pentylphenyl)benzoic acid 4-cyano-3,5-difluorophenyl (abbreviation: PPEP-5FCNF) which was used in Example 1 is described below.

Synthetic method of 4-(4-n-pentylphenyl)benzoic acid 4-cyano-3,5-difluorophenyl (abbreviation: PPEP-5FCNF)

A synthetic scheme (A-1) of PPEP-5FCNF (abbreviation) which is represented by a structural formula (100) is shown below.

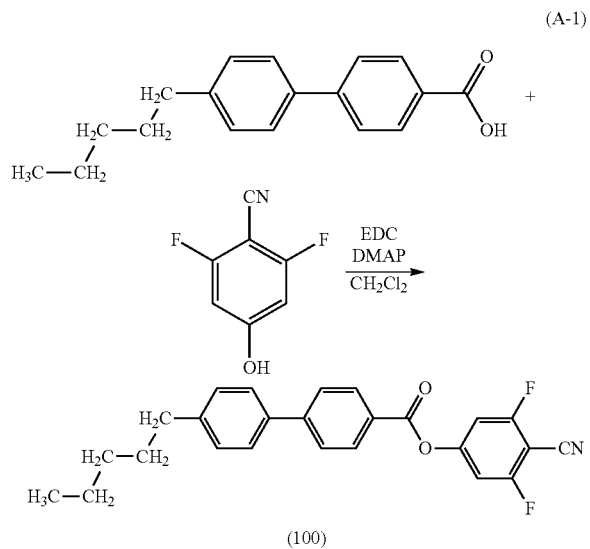

(A-1)

(100)

Into a 50-mL flask, 2.3 g (8.6 mmol) of 4-(4-n-Pentylphenyl)benzoic acid, 1.3 g (8.4 mmol) of 2,6-difluoro-4-hydroxybenzonitrile, 0.16 g (1.3 mmol) of 4-dimethylaminopyridine, and 8.6 mL of dichloromethane were put, and stirring was performed. To the mixture, 1.8 g (9.4 mmol) of 1-ethyl-3-(3-dimethylaminopropyl) carbodiimide hydrochloride (EDC) was added, and the resulting mixture was stirred at room temperature under the air atmosphere for 18 hours. After a predetermined time, water was added to the obtained mixture, and an aqueous layer was extracted with dichloromethane. The obtained extracted solution and an organic layer were combined and washed with a saturated aqueous solution of sodium hydrogen carbonate and saturated saline, and then, the organic layer was dried with magnesium sulfate. The mixture was gravity filtered, and the obtained filtrate was condensed to give a light brown solid. This solid was purified by silica gel column chromatography (developing solvent: toluene). The resulting fraction was concentrated to give a white solid. This solid was purified by high performance liquid chromatography (HPLC) (developing solvent: chloroform). The obtained fractions obtained were concentrated to obtain 2.7 g of a white solid which was a target substance in 79% yield.

Further, 2.7 g of the obtained white solid was purified by distillation, whereby 2.5 g of a white solid which was a target substance, was obtained in 93% yield.

This compound was identified by a nuclear magnetic resonance method (NMR) as 4-(4-n-pentylphenyl)benzoic acid 4-cyano-3,5-difluorophenyl (PPEP-5FCNF) which was a target substance.

Figure 12A:
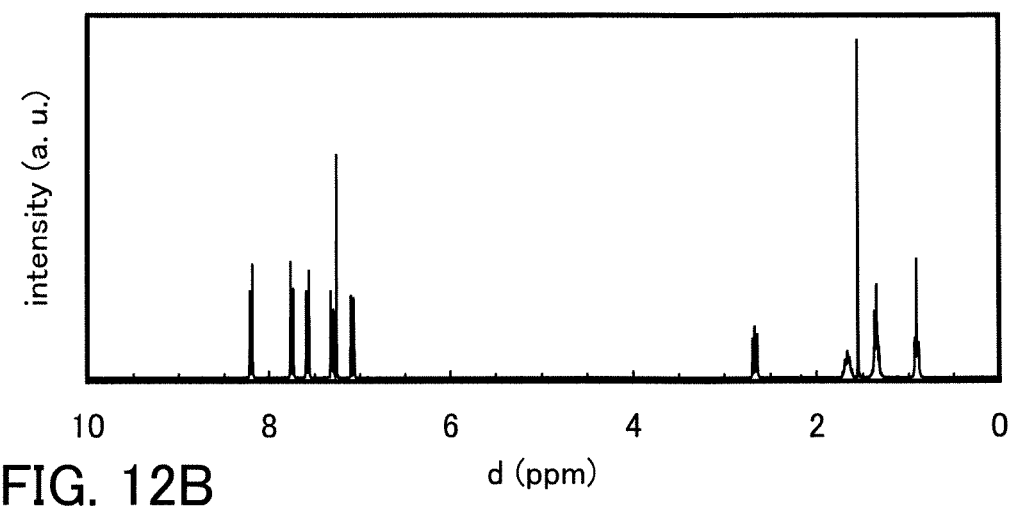
FIGS. 12A to 12C are $^1$H NMR charts of PPEP-5FCNF.
Figure 12B:
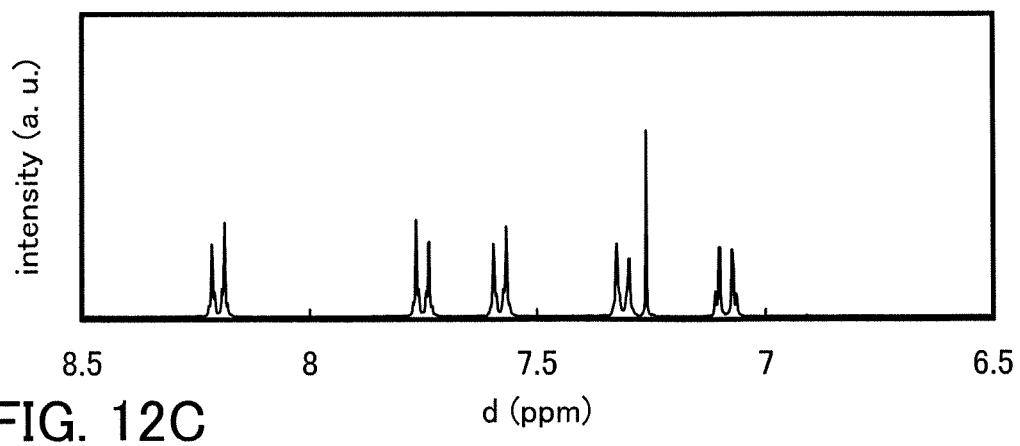
Figure 12C:
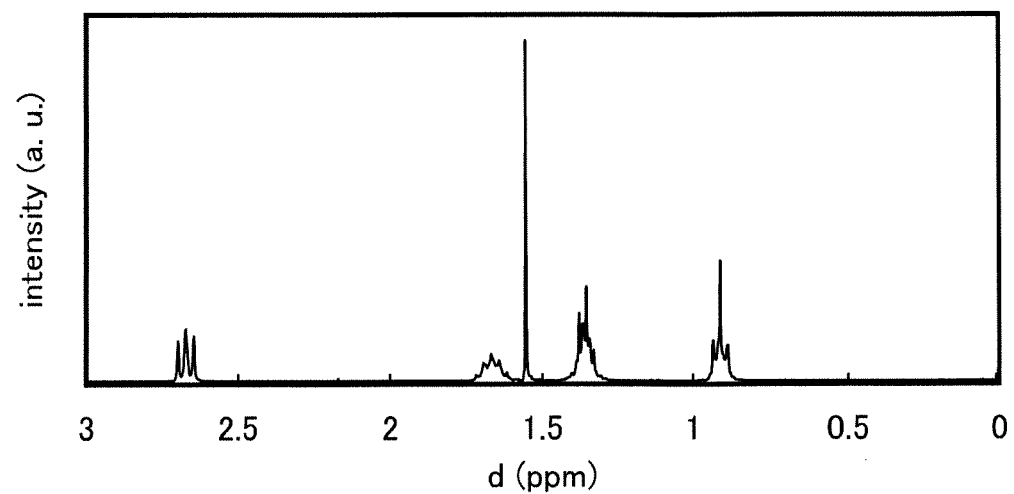

$^1$H NMR data of the obtained substance are: $^1$H NMR ($CDCl_3$, 300 MHz): δ(ppm)=0.89 (t, 3H), 1.30-1.34 (m, 8H), 1.63-1.69 (m, 2H), 2.67 (t, 2H), 7.09 (d, 2H), 7.31 (d, 2H), 7.58 (d, 2H), 7.75 (d, 2H), 8.20 (d, 2H). FIGS. 12A to 12C are $^1$H NMR charts of the obtained substance. Note that FIG. 12B is an enlarged chart of a portion of 6.5 ppm to 8.5 ppm in FIG. 12A, and FIG. 12C is an enlarged chart of a portion of 0.0 ppm to 3.0 ppm in FIG. 12A.

This application is based on Japanese Patent Application serial no. 2010-117325 filed with Japan Patent Office on May 21, 2010, and Japanese Patent Application serial no. 2011-018023 filed with Japan Patent Office on Jan. 31, 2011, the entire contents of which are hereby incorporated by reference.

REFERENCE NUMERALS

200: first substrate, 201: second substrate, 208: liquid crystal layer, 230: pixel electrode layer, 232: common electrode layer, 401: gate electrode layer, 402: gate insulating layer, 403: semiconductor layer, 404a: source region or drain region, 404b: source region or drain region, 405a: wiring layer, 405b: wiring layer, 407: insulating film, 408: common wiring layer, 409: insulating film, 413: interlayer film, 419: common electrode layer, 420: transistor, 430: transistor, 441: first substrate, 442: second substrate, 444: liquid crystal layer, 443a: polarizing plate, 443b: polarizing plate, 446: second electrode layer, 446a: second electrode layer, 446b: second electrode layer, 446c: second electrode layer, 446d: second electrode layer, 446e: second electrode layer, 446f: second electrode layer, 446g: second electrode layer, 446h: second electrode layer, 447: first electrode layer, 447a: first electrode layer, 447b: first electrode layer, 447c: first electrode layer, 447d: first electrode layer, 447e: first electrode layer, 447f: first electrode layer, 447g: first electrode layer, 447h: first electrode layer, 450: insulating film, 1700: substrate, 1701a: pixel electrode layer, 1701b: pixel electrode layer, 1701c: pixel electrode layer, 1703: liquid crystal layer, 1706a: common electrode layer, 1706b: common electrode layer, 1706c: common electrode layer, 1707: insulating film, 1710: substrate, 1713: liquid crystal element, 1714a: polarizing plate, 1714b: polarizing plate, 2700: electronic book reader, 2701: housing, 2703: housing, 2705: display portion, 2707: display portion, 2711: hinge, 2721: power switch, 2723: operation key, 2725: speaker, 2800: housing, 2801: housing, 2802: display panel, 2803: speaker, 2804: microphone, 2805: operation key, 2806: pointing device, 2807: camera lens, 2808: external connection terminal, 2810: solar cell, 2811: external memory slot, 3001: main body, 3002: housing, 3003: display portion, 3004: keyboard, 3021: main body, 3022: stylus, 3023: display portion, 3024: operation button, 3025: external interface, 3051: main body, 3053: eyepiece, 3054: operation switch, 3055: display portion B, 3056: battery, 3057: display portion A, 4001: first substrate, 4002: pixel portion, 4003: signal line driver circuit, 4003a: signal line driver circuit, 4003b: signal line driver circuit, 4004: scan line driver circuit, 4005: sealant, 4006: second substrate, 4008: liquid crystal layer, 4010: transistor, 4011: transistor, 4013: liquid crystal element, 4015: connection terminal electrode, 4016: terminal electrode, 4018: FPC, 4019: anisotropic conductive film, 4020: insulating layer, 4021: interlayer film, 4030: pixel electrode layer, 4031: common electrode layer, 4032a: polarizing plate, 4032b: polarizing plate, 4034: light-blocking layer, 9600: television set, 9601: housing, 9603: display portion, 9605: stand, 9630: housing, 9631: display portion, 9632: operation key, 9633: solar cell, 9634: charge and discharge control circuit, 9635: battery, 9636: converter, 9637: converter.

The invention claimed is:

1. A liquid crystal composition comprising:
a chiral agent, and
a nematic liquid crystal including a compound represented by a structural formula:

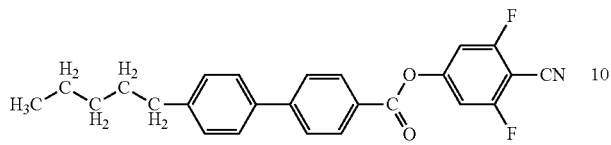

wherein the liquid crystal composition exhibits a blue phase.

2. A liquid crystal display device including a liquid crystal layer having the liquid crystal composition according to claim 1.

3. The liquid crystal composition according to claim 1, further comprising:
a monomer; and
a photopolymerization initiator.

4. The liquid crystal composition according to claim 3, wherein the monomer is a monofunctional monomer or a polyfunctional monomer.

5. The liquid crystal composition according to claim 4, wherein a liquid crystalline monofunctional monomer is included as the monofunctional monomer, and
wherein a liquid crystalline polyfunctional monomer is included as the polyfunctional monomer.

6. The liquid crystal composition according to claim 4, wherein a non-liquid-crystalline monofunctional monomer is included as the monofunctional monomer, and
wherein a non-liquid-crystalline polyfunctional monomer is included as the polyfunctional monomer.

7. A liquid crystal display device comprising:
a liquid crystal layer, the liquid crystal layer comprising a liquid crystal composition,
wherein the liquid crystal composition exhibits a blue phase, and
wherein the liquid crystal composition comprising:
a chiral agent;
a polymer;
a photopolymerization initiator, and
a nematic liquid crystal including a compound represented by a structural formula given below

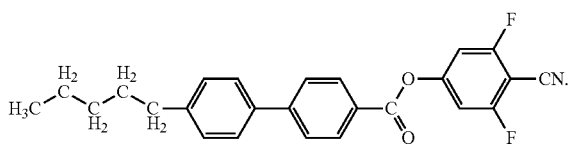 [SMILES: CCCCCc1ccc(-c2ccc(C(=O)Oc3cc(F)c(C#N)c(F)c3)cc2)cc1]

8. The liquid crystal composition according to claim 7, wherein the polymer is a monofunctional polymer or a polyfunctional polymer.

9. A liquid crystalline compound represented by a structural formula:

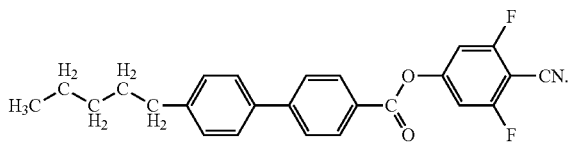 [SMILES: CCCCCc1ccc(-c2ccc(C(=O)Oc3cc(F)c(C#N)c(F)c3)cc2)cc1]

* * * * *